(12) United States Patent
Ohashi

(10) Patent No.: US 7,137,717 B2
(45) Date of Patent: Nov. 21, 2006

(54) OUTER MIRROR DEVICE FOR VEHICLE

(75) Inventor: Masatsugu Ohashi, Aichi-ken (JP)

(73) Assignee: Kabushiki Kaisha Tokai-Rika-Denki-Seisakusho, Niwa-gun (JP)

( * ) Notice: Subject to any disclaimer, the term of this patent is extended or adjusted under 35 U.S.C. 154(b) by 104 days.

(21) Appl. No.: 10/721,467

(22) Filed: Nov. 26, 2003

(65) Prior Publication Data
US 2004/0114261 A1   Jun. 17, 2004

(30) Foreign Application Priority Data
Nov. 28, 2002   (JP)   ............................. 2002-345101

(51) Int. Cl.
G02B 7/182 (2006.01)
B60R 1/06 (2006.01)

(52) U.S. Cl. ..................... 359/877; 359/874; 359/876

(58) Field of Classification Search ................ 359/843, 359/872, 873, 874, 876, 877
See application file for complete search history.

(56) References Cited

U.S. PATENT DOCUMENTS

| 4,504,117 A * | 3/1985 | Mittelhauser ................ 359/876 |
| 4,678,295 A * | 7/1987 | Fisher ........................... 359/874 |
| 4,770,522 A * | 9/1988 | Alten ........................... 359/873 |
| 4,871,953 A | 10/1989 | Anstee |
| 4,915,493 A * | 4/1990 | Fisher et al. ................ 359/874 |
| 4,940,322 A * | 7/1990 | Hamamoto et al. ......... 359/873 |
| 4,986,646 A * | 1/1991 | Hamamoto et al. ......... 359/873 |
| 5,170,288 A * | 12/1992 | Imaizumi et al. ........... 359/507 |
| 5,196,965 A | 3/1993 | Lang et al. |
| 5,226,034 A * | 7/1993 | Nagayama et al. ......... 359/873 |
| 5,305,144 A * | 4/1994 | Mori et al. .................. 359/507 |
| 5,959,367 A | 9/1999 | O'Farrell et al. |
| 6,000,805 A * | 12/1999 | Inagaki ....................... 359/871 |
| 6,019,475 A * | 2/2000 | Lynam et al. ............... 359/879 |
| 6,093,976 A | 7/2000 | Kramer et al. |
| 6,094,027 A * | 7/2000 | Willmore et al. ........... 318/652 |
| 6,163,083 A | 12/2000 | Kramer et al. |
| 6,175,164 B1 | 1/2001 | O'Farrell et al. |
| 6,213,612 B1 * | 4/2001 | Schnell et al. .............. 359/877 |
| 6,217,181 B1 | 4/2001 | Lynam et al. |
| 6,247,823 B1 * | 6/2001 | Fuerst et al. ................ 359/871 |
| 6,382,806 B1 * | 5/2002 | Fuchs et al. ................ 359/877 |
| 6,485,155 B1 * | 11/2002 | Duroux et al. .............. 359/877 |

FOREIGN PATENT DOCUMENTS

JP    2001-332316    11/2001

* cited by examiner

Primary Examiner—Ricky D. Shafer
(74) Attorney, Agent, or Firm—Roberts Mlotkowski & Hobbes; Thomas W. Cole

(57) ABSTRACT

In an outer mirror device for a vehicle, an electrically-driven retracting unit, a mirror surface angle adjusting unit, a mirror surface angle detecting sensor, a foot lamp device, a heater, and an ECU which is a control device, which are respectively internal mechanisms, are disposed within a door mirror visor which covers a reverse surface side of a mirror and between the mirror and which a space is formed. A wire harness led into the door mirror visor is only two power source wires and three signal wires connected to the ECU. As compared with a structure in which the ECU is disposed outside of the door mirror visor, a number of wires can be greatly reduced.

8 Claims, 9 Drawing Sheets

OUTER MIRROR DEVICE FOR VEHICLE

CROSS-REFERENCE TO RELATED APPLICATION

This application claims priority under 35USC 119 from Japanese Patent Application No. 2002-345101, the disclosure of which is incorporated by reference herein.

BACKGROUND OF THE INVENTION

1. Field of the Invention

The present invention relates to an outer mirror device for a vehicle which has a mirror for rearward viewing and which is mounted to the exterior of a vehicle body.

2. Description of the Related Art

In an outer mirror device for a vehicle which is mounted to the left and right doors of a vehicle, a mirror for rearward viewing is disposed in a vicinity of the opening of a mirror visor which forms the design of the outer mirror device for a vehicle. A space is formed between the mirror and the mirror visor which covers the reverse surface side of the mirror. In a so-called retractable outer mirror device for a vehicle, the mirror visor is supported so as to be rotatable with respect to a stay which is fixed to the door.

Internal mechanisms for operating the outer mirror device for a vehicle from the driver's seat are accommodated in the space at the interior of the mirror visor. Generally, a mirror surface angle adjusting unit which changes the mirror surface angle of the mirror by operation of a switch near the driver's seat, an electrically-driven retracting unit which moves the outer mirror device for a vehicle between a retracted position of being retracted along the door and a usage position at which the outer mirror device for a vehicle is extended such that the region substantially toward the rear of the vehicle can be seen from the driver's seat, and the like are used as the internal mechanisms. The mirror surface angle adjusting unit, the electrically-driven retracting unit, and the like have an electric motor therein. When the unit receives power and is operated, the function of the unit is carried out.

In order to supply power to the mirror surface angle adjusting unit, the electrically-driven retracting unit, or the like, in the outer mirror device for a vehicle, a supporting shaft, which is fixed to the stay and which rotatably supports the mirror visor, is made to be hollow, and power supply wires are led into the mirror visor through the interior of the supporting shaft (see, for example, Japanese Patent Application Laid-Open (JP-A) No. 2001-332316). In this way, the wires can be laid so as to not be affected by the rotation of the mirror visor with respect to the door (the stay).

Moreover, in recent years, it has been thought to place various internal mechanisms such as the following for example which are operated by being electrically charged (energized), at the interior space in the outer mirror device for a vehicle and in addition to the aforementioned mirror surface angle adjusting unit and electrically-driven retracting unit: a mirror anti-glare mechanism using an electrochromic element, a water droplet removing mechanism or fogging preventing mechanism using ultrasonic vibrations or a heater, an illuminating device illuminating light toward the feet of a vehicle occupant before he/she enters the vehicle, an image pick-up device for covering the dead angle at the vehicle, a direction indicating device, or the like.

Such an outer mirror device for a vehicle will be described on the basis of FIG. 9. An outer mirror device 200 for a vehicle shown in FIG. 9 has a mirror 202 for rearward viewing, and a mirror visor 204 covering the reverse surface of the mirror 202. The mirror visor 204 is structured by a visor rim 204A and a visor cover 204B which are connected together. A frame 206 is fixed between the visor rim 204A and the visor cover 204B.

The outer mirror device 200 for a vehicle has an electrically-driven retracting unit 208, a mirror surface angle adjusting unit 210, a mirror surface angle detecting sensor 212, a heater 214, and a foot lamp device 216, each of which is an internal mechanism accommodated within the mirror visor 204 (i.e., between the mirror visor 204 and the mirror 202).

The electrically-driven retracting unit 208 is fixed to the frame 206 in a state in which a stand 220, which is a supporting shaft fixed to a stay 218 which is fixed to the door of the vehicle, is inserted through the electrically-driven retracting unit 208. An electric motor, a reduction mechanism, and the like are disposed at the interior of the electrically-driven retracting unit 208. Due to the electrically-driven retracting unit 208 rotating around the stand 220 due to the electric motor being power supplied, the outer mirror device 200 for a vehicle can be moved between a usage position at which the rearward region can be viewed by the mirror 202, and a retracted position at which the outer mirror device 200 for a vehicle is folded over along the door.

A driving mechanism portion 210A of the mirror surface angle adjusting unit 210 is fixed to the frame 206. A mirror holder 210B of the mirror surface angle adjusting unit 210 passes through the substantially frame-shaped visor rim 204A and is fixed to the reverse surface side of the mirror 202. The driving mechanism portion 210A supports the mirror holder 210B by a pivot structure such that the mirror holder 210B can swing in the vertical direction and the horizontal direction, and has drive rods which are provided at a position offset in the vertical direction from this supporting point and at a position offset in the horizontal direction from this supporting point, respectively. Respective one end portions of the drive rods are rotatably connected to the mirror holder 210B. Due to the drive rods moving in the axial direction due to the driving forces of the electric motors, the mirror surface angle of the mirror 202 in the vertical direction and in the horizontal direction is changed. Namely, the driving mechanism portion 210A of the mirror surface angle adjusting unit 210 is structured so as to include two electric motors.

The mirror surface angle detecting sensor 212 has a pair of sensor rods 212B which project from a case 212A fixed to the driving mechanism portion 210A. Each sensor rod 212B is urged by a spring toward the side, in the axial direction, of projecting from the case 212A. One of the sensor rods 212B is pressed to contact the mirror holder 210B at a position offset in the vertical direction from the aforementioned point of support by the pivot structure. The other sensor rod 212B is pressed to contact the mirror holder 210B at a position offset in the horizontal direction from the aforementioned point of support. In this way, the respective sensor rods 212B follow the changes in the mirror surface angle of the mirror 202, while extending and retracting with respect to the case 212A. Variable resistance type sensors, which detect the positions (the amounts of movement) of the respective sensor rods 212B, are provided within the case 212A, and can detect the mirror surface angle of the mirror 202 by the positions of the respective sensor rods 212B. Namely, the mirror surface angle detecting sensor 212 has two variable resistance type sensors.

The heater 214 is formed in the shape of a sheet or in the shape of a thin plate, and is mounted to the reverse surface of the mirror 202 (between the mirror 202 and the mirror holder 210B) Due to the heater 214 being power supplied, the heater 214 generates heat and heats the mirror. Defrosting of the mirror is thereby carried out.

The foot lamp device 216 is structured by a lens and a case, which accommodates a light bulb or an LED, being joined together, and is fixed to the lower portion of the mirror visor 204. The lens structures a portion of the outer lower surface of the mirror visor 204. When the light bulb or the like emits light, it illuminates the region beneath, i.e., the feet of a person who is near the door.

The above-described electrically-driven retracting unit 208, mirror surface angle adjusting unit 210, mirror surface angle detecting sensor 212, heater 214, and foot lamp device 216 are electrically connected via respective wires to a door ECU 222 which is a control device. The door ECU 222 is disposed inside the door of the vehicle (i.e., outside of the door mirror device for a vehicle), and, in addition to carrying out control of the aforementioned respective internal mechanisms, also carries out control of the mechanisms at the door such as the power window device and the like.

The plural wires connected to the door ECU 22 by a connector 224 are bundled and covered so as to form a wire harness 226, and are passed through the interiors of the stay 218 and the hollow stand 220 (the electrically-driven retracting unit 208), and are led into the mirror visor 204. Within the mirror visor 204, the covering of the wires is removed and the respective wires are connected to the internal mechanisms corresponding respectively thereto.

Specifically, two wires 228 for supplying power to the electric motor are connected via a waterproof connector 230 to the electrically-driven retracting unit 208. Two wires 232 for supplying power to each of the two electric motors are connected via a waterproof connector 234 to the mirror surface angle adjusting unit 210. (i.e., there are a total of four of the wires 232). A total of four wires 236 for energizing the two variable resistance sensors and for detection are connected via a waterproof connector 238 to the mirror surface angle detecting sensor 212. Two wires 240 for supplying power are connected to the heater 214 via a waterproof connector 242. Two wires 244 for supplying power to the light bulb or the like are connected to the foot lamp device 216 via a waterproof connector 246.

Namely, in the outer mirror device 200 for a vehicle shown in FIG. 9, a total of fourteen wires are led into the mirror visor 204. Note that the respective cases (e.g., a case 212A and the like) of the electrically-driven retracting unit 208, the mirror surface angle adjusting unit 210, the mirror surface angle detecting sensor 212, the heater 214, and the foot lamp device 216 are waterproof structures respectively. Further, the lower portion of the stand 220 is covered by a stay under cover 248.

In this way, at the outer mirror device 200 for a vehicle, a structure in which plural internal mechanisms are accommodated within the mirror visor 204 is realized.

However, as described above, in the conventional outer mirror device 200 for a vehicle, the wires for electrically charging (energizing) or for supplying power to the respective internal mechanisms must be led into the mirror visor 204. More specifically, for each of the electric machines (the electric motor, the sensor, the heater, the light bulb, and the like) in the respective internal mechanisms, two or three or more wires must be led through the interior of the stand 220 which rotatably supports the mirror visor 204. Therefore, a problem arises in that the number of internal mechanisms which can be accommodated within the mirror visor 204 is limited by the number of wires which can be passed through the stand 220.

Namely, within the range of the dimensions of the stand 220 which are determined in accordance with the requirements concerning the mechanical strength and functions and the like, there are limits to increasing the number of wires which can be led into the mirror visor. More specifically, in the above-described outer mirror device 200 for a vehicle shown in FIG. 9, it is difficult to pass more wires (15 or more wires) through the stand 220, and it is not possible to provide other internal mechanisms.

SUMMARY OF THE INVENTION

In view of the aforementioned, an object of the present invention is to provide an outer mirror device for a vehicle in which the number of wires which are led from the vehicle body into the mirror visor is reduced.

In order to achieve the above object, an outer mirror device for a vehicle relating to a first aspect of the present invention comprises: a mirror for rearward viewing; a mirror surface angle adjusting mechanism mounted to the mirror, which receives power and adjusts a mirror surface angle of the mirror; a mirror surface angle detecting mechanism which can detect the mirror surface angle of the mirror; a control device electrically connected to the mirror surface angle adjusting mechanism and the mirror surface angle detecting mechanism, and supplying power to the mirror surface angle adjusting mechanism on the basis of an operation signal, and electrically charging (communicating with) the mirror surface angle detecting mechanism at appropriate times; and a mirror visor which accommodates the mirror surface angle adjusting mechanism, the mirror surface angle detecting mechanism and the control device between the mirror visor and the mirror.

In the outer mirror device for a vehicle of the first aspect, the mirror surface angle adjusting mechanism, the mirror surface angle detecting mechanism, and the control device are accommodated between the mirror and the mirror visor. When an operation signal due to operation of a switch located near the driver's seat for example is inputted, on the basis of the operation signal, the control device supplies power to the mirror surface angle adjusting mechanism and operates the mirror surface angle adjusting mechanism so as to change the mirror surface angle of the mirror. Further, the control device electrically charges (communicates with) the mirror surface angle detecting mechanism at appropriate times, so that the mirror surface angle of the mirror is detected. Note that the results of detection are, for example, stored in the control device at the time a storage instructing signal is inputted to the control device. The stored mirror surface angle is used for returning the mirror to the stored mirror surface angle by the control device supplying power to the mirror surface angle adjusting mechanism when a return instructing signal is inputted.

Here, the control device is disposed within the mirror visor (between the mirror visor and the mirror). Therefore, it suffices for the wires which are led from the vehicle body into the mirror visor to be signal wires for inputting for example, the aforementioned operation signal, storage instructing signal, and return instructing signal (or, it is possible for them to be only one signal wire) and (two) power source wires connected to the control device. Therefore, as compared with a case in which power source wires are led respectively to the mirror surface angle adjusting mechanism (requiring four power supply wires when there are two electric motors) and the mirror surface angle detecting mechanism (requiring four electrically charging wires when there are two sensors), the number of wires which are led into the mirror visor is reduced. The effects of reducing the number of wires led into the mirror visor are more marked when the number of internal mechanisms, which are accommodated within the mirror visor together with the mirror surface angle adjusting mechanism and the mirror surface angle detecting mechanism and which are controlled by the control device, is increased. In this way, it is possible to dispose a large number of internal mechanisms within the mirror visor while maintaining (not being changed) the inner diameter of the hole (e.g., the stand) for leading the wires into the mirror visor.

Further, it suffices for the control device, which is disposed within the door of the vehicle and which conventionally also controlled the internal mechanisms including the mirror surface angle adjusting mechanism and the mirror surface angle detecting mechanism, to carry out only control of the power window and the like for example. Therefore, there is no need for an exclusive design corresponding to the specifications of the outer mirror device for a vehicle, i.e., the number and the types of the built-in internal mechanisms. The control device at the door can be used in common, without depending on the specifications of the outer mirror device for a vehicle.

In this way, in the outer mirror device for a vehicle of the first aspect, the number of wires led into the mirror visor from the vehicle body can be decreased.

Further, it is possible that the mirror surface angle adjusting mechanism has a first case, and the control device has a second case and the mirror surface angle detecting mechanism is provided in the second case. Moreover, it is possible that the first case and the second case are integral.

In order to achieve the above-described object, an outer mirror device for a vehicle relating to a second aspect of the invention comprises: a mirror visor which covers a back surface of a mirror for rearward viewing to form a space between the mirror and the mirror visor; a mirror surface angle adjusting mechanism which has a first case and an electric motor accommodated in the first case, which is mounted to the mirror within the space, and which is able to adjust a mirror surface angle of the mirror by driving force of the electric motor; a control device having a second case disposed within the space, and a control substrate which is accommodated within the second case and at which is provided a control circuit supplying power to the electric motor on the basis of an operation signal; a power supplying terminal provided at the control substrate and passing through the second case; and a connector portion provided integrally with the second case, and fixed to the first case to connect the power supplying terminal to the electric motor.

In the outer mirror device for a vehicle of the second aspect, the reverse (back) surface of the mirror for rearward viewing is covered by the mirror visor, and a space is formed between (the reverse surface of) the mirror and (the inner surface of) the mirror visor. The mirror surface angle adjusting mechanism and the control device are accommodated in this space. At the control device, a terminal for power supply, which is provided at the control substrate within the second case, projects out from the second case. A connector portion provided integrally with the second case is fixed to the first case of the mirror surface angle adjusting mechanism. The power supplying terminal is thereby connected so as to be able to supply power to the electric motor of the mirror surface angle adjusting mechanism. When, for example, an operation signal due to operation of a switch near the driver's seat is inputted, the control circuit of the control device, on the basis of the operation signal, supplies power to the electric motor via the power supplying terminal, and operates the mirror surface angle adjusting mechanism such that the mirror surface angle of the mirror is changed.

Here, the control device is disposed within the mirror visor (in the space formed by the mirror visor and the mirror). Therefore, it suffices for the wires which are led from the vehicle body into the mirror visor to be (two) power source wires connected to the control device and signal wires for inputting, for example, the aforementioned operation signal. Therefore, as compared with a case in which power source wires are led directly to the mirror surface angle adjusting mechanism (requiring four power supply wires when there are two electric motors), the number of wires which are led into the mirror visor is reduced. The effects of reducing the number of wires led into the mirror visor are marked to the extent that the number of internal mechanisms, which are accommodated in the mirror visor together with the mirror surface angle adjusting mechanism and which are controlled by the control device, can be increased. In this way, it is possible to dispose a large number of internal mechanisms within the mirror visor while maintaining the inner diameter of the hole (e.g., the stand) for leading the wires into the mirror visor.

By directly fixing the connector portion of the second case structuring the control device and the first case structuring the mirror surface angle adjusting mechanism, the power supplying terminal is connected to the electric motor of the mirror surface angle adjusting mechanism (the control device and the mirror surface angle adjusting mechanism are electrically connected) Therefore, this electrical connection is carried out by the operation of fixing the mirror surface angle adjusting mechanism and the control device within the mirror visor. Work for connecting wires by a waterproof connector, which was needed in the conventional art, is not necessary. Further, the waterproof connector which was needed in the conventional art is not necessary. Therefore, this, together with the doing away with the aforementioned wire connecting work, contributes to lowering the cost of the outer mirror device for a vehicle. In addition, the space for the laying of wires within the mirror visor is reduced.

Further, it suffices for the control device, which is disposed within the door of the vehicle and which conventionally also controlled the internal mechanisms including the mirror surface angle adjusting mechanism, to carry out only control of the power window and the like for example. Therefore, there is no need for an exclusive design corresponding to the specifications of the outer mirror device for a vehicle, i.e., the number and the types of the built-in internal mechanisms. The control device at the door can be used in common, without depending on the specifications of the outer mirror device for a vehicle.

In this way, in the outer mirror device for a vehicle of the second aspect, the number of wires led into the mirror visor from the vehicle body can be decreased.

In an outer mirror device for a vehicle relating to a third aspect of the present invention, in the outer mirror device for a vehicle of the second aspect, the mirror surface angle adjusting mechanism has a rotating member rotating due to rotation of the electric motor, and a drive rod which moves rectilinearly due to rotation of the rotating member and which changes the mirror surface angle of the mirror, and the mirror surface angle detecting sensor, which detects one of a position of the drive rod and a rotational position of the rotating member, is provided within the second case.

In accordance with the outer mirror device for a vehicle of the third aspect, when power is supplied from the control device to the electric motor (i.e., when the electric motor receives power from the control device) and the electric motor operates, the rotating member rotates, and the drive rod moves straight due to this rotation. Namely, the rotation of the electric motor is converted, by the rotating member and the drive rod, into rectilinear motion of the drive rod, and the mirror surface angle of the mirror is adjusted.

Then, due to the mirror surface angle detecting sensor detecting the position (displacement) of the drive rod or the rotational position (angular displacement) of the rotating member, the mirror surface angle of the mirror is detected. Note that the results of detection are, for example, stored in the control device at the time a storage instructing signal is inputted to the control device. When a return instructing signal is inputted, the control device supplies power to the mirror surface angle adjusting mechanism, and the stored mirror surface angle is used for returning the mirror to the stored mirror surface angle. Further, the mirror surface angle detecting sensor detects the mirror surface angle of the mirror on the basis of the position (displacement) of the drive rod or the rotational position (angular displacement) of the rotating member. Therefore, as compared with a structure in which the mirror surface angle of the mirror is detected on the basis of the position (displacement) of a specific region of a mirror holder which holds the mirror as in the conventional art, the accuracy of detecting the mirror surface angle, and the controllability when control is carried out on the basis of the results of detection (e.g., the accuracy of returning to the stored mirror surface angle) are improved.

Here, the mirror surface angle detecting sensor is provided (accommodated) within the second case which structures the control circuit. Therefore, there is no need for an exclusive case for preventing entry of water into the mirror surface angle detecting sensor. Namely, the number of places where waterproofing countermeasures are taken within the mirror visor is reduced, and a waterproof connector which was needed in the conventional art is not needed. In this way, it suffices for the mirror surface angle detecting sensor to be provided within the second case rather than in a case used exclusively therefor as in the conventional art. Due to functional requirements, a portion of the mirror surface angle detecting sensor (e.g., a portion of a part corresponding to the conventional sensor rod 212B) may of course project outside of the second case.

In order to achieve the above-described object, an outer mirror device for a vehicle relating to a fourth aspect of the present invention comprises: a mirror visor which covers a back surface of a mirror for rearward viewing to form a space between the mirror and the mirror visor; a mirror surface angle adjusting mechanism at which an electric motor, a rotating member rotating due to rotation of the electric motor, and a portion of a drive rod connected to the mirror and moving rectilinearly due to rotation of the rotating member, are accommodated in a first case, the mirror surface angle adjusting mechanism changing a mirror surface angle of the mirror by rectilinear movement of the drive rod; a control device having a second case which is connected to the first case within the space, and a control substrate which is accommodated within the second case and at which is provided a control circuit power-supplying the electric motor on the basis of an operation signal; and a mirror surface angle detecting sensor disposed within the second case, and detecting one of a position of the drive rod and a rotational position of the rotating member.

In the outer mirror device for a vehicle of the fourth aspect, the reverse surface of the mirror for rearward viewing is covered by the mirror visor, and a space is formed between (the reverse surface of) the mirror and (the inner surface of) the mirror visor. The mirror surface angle adjusting mechanism and the control device are accommodated within this space. When an operation signal due to operation of a switch located near the driver's seat for example is inputted, on the basis of the operation signal, the control circuit of the control device supplies power to the electric motor. At the mirror surface angle adjusting mechanism in which power has been supplied to the electric motor, the rotating member rotates, and due to this rotation, the drive rod, which is connected either directly or indirectly to the mirror, moves rectilinearly and changes the mirror surface angle of the mirror.

Further, the first case, which forms the mirror surface angle adjusting mechanism and accommodates the rotating member and a portion of the drive rod, and the second case, which structures the control device and accommodates the control circuit, are connected together. Due to the mirror surface angle detecting sensor which is disposed within the second case detecting the position (displacement) of the drive rod or the rotational position (angular displacement) of the rotating member, the mirror surface angle of the mirror is detected. Note that the results of detection are, for example, stored in the control device at the time when a storage instructing signal is inputted to the control device. When a return instructing signal is inputted, the control device supplies power to the mirror surface angle adjusting mechanism, and the stored mirror surface angle is used for returning the mirror to the stored mirror surface angle. Further, the mirror surface angle detecting sensor detects the mirror surface angle of the mirror on the basis of the position (displacement) of the drive rod or the rotational position (angular displacement) of the rotating member. Therefore, as compared with a structure in which the mirror surface angle of the mirror is detected on the basis of the position (displacement) of a specific region of a mirror holder which holds the mirror as in the conventional art, the accuracy of detecting the mirror surface angle, and the controllability when control is carried out on the basis of the results of detection (e.g., the accuracy of returning to the stored mirror surface angle) are improved.

Here, the control device is disposed within the mirror visor (in the space formed by the mirror visor and the mirror). Therefore, it suffices for the wires which are led from the vehicle body into the mirror visor to be (two) power source wires connected to the control device and signal wires for inputting the aforementioned operation signal and the like. Therefore, as compared with a case in which power source wires are led respectively to the mirror surface angle adjusting mechanism (requiring four power supply wires when there are two electric motors) and to the mirror surface angle detecting sensor (requiring four electrically charging wires when there are two sensors), the number of wires which are led into the mirror visor is reduced. The more marked the effects of reducing the number of wires introduced into the mirror visor, the more the number of internal mechanisms, which are accommodated in the mirror visor together with the mirror surface angle adjusting mechanism and the mirror surface angle detecting sensor and which are controlled by the control device, is increased. In this way, it is possible to dispose a large number of internal mechanisms within the mirror visor while maintaining the inner diameter of the hole (e.g., the stand) for leading the wires into the mirror visor.

Here, the mirror surface angle detecting sensor is provided (accommodated) within the second case which structures the control circuit. Therefore, there is no need for an exclusive case for preventing entry of water into the mirror surface angle detecting sensor. Namely, the number of places where waterproofing countermeasures are taken within the mirror visor are reduced, and a waterproof connector which was needed in the conventional art is not needed. In this way, it suffices for the mirror surface angle detecting sensor to be provided within the second case rather than in a case used exclusively therefor as in the conventional art. Due to functional requirements, a portion of the mirror surface angle detecting sensor (e.g., a portion of a part corresponding to the conventional sensor rod 212B) may of course project outside of the second case.

Further, it suffices for the control device, which is disposed within the door of the vehicle and which conventionally also controlled the internal mechanisms including the mirror surface angle adjusting mechanism and the mirror surface angle detecting mechanism, to carry out only control of the power window and the like for example. Therefore, there is no need for an exclusive design corresponding to the specifications of the outer mirror device for a vehicle, i.e., the number and the types of the built-in internal mechanisms. The control device at the door can be used in common, without depending on the specifications of the outer mirror device for a vehicle.

In this way, in the outer mirror device for a vehicle of the fourth aspect, the number of wires led into the mirror visor from the vehicle body can be decreased.

In an outer mirror device for a vehicle relating to a fifth aspect of the present invention, in the outer mirror device for a vehicle of the third aspect or the fourth aspect, the mirror surface angle detecting sensor is provided at the control substrate.

In the outer mirror device for a vehicle of the fifth aspect, the mirror surface angle detecting sensor is provided at the control substrate at which the control circuit is provided. Therefore, the control device and the mirror surface angle detecting sensor can be electrically connected on the control substrate, and wire connection work using wires (i.e., work for fitting-together with a connector) is not needed.

In an outer mirror device for a vehicle relating to a sixth aspect of the invention, in the outer mirror device for a vehicle of the fifth aspect, the mirror surface angle detecting sensor detects, in a non-contact manner, one of the position of the drive rod and the rotational position of the rotating member.

In the outer mirror device for a vehicle of the sixth aspect, the mirror surface angle detecting sensor provided at the control substrate detects, in a non-contact manner, the position of the drive rod or the rotational position of the rotating member, i.e., detects the mirror surface angle of the mirror. Therefore, there is no need for the mirror surface angle detecting sensor and the drive rod and the like to contact or engage or the like in a positioned state, and the ability to assemble the outer mirror device for a vehicle improves. Moreover, the application of mechanical force from the drive rod or the like to the control substrate is prevented. Note that, for example, a rotational angle sensor or a remote sensor such as a distance sensor or a light sensor or the like may be used as the non-contact type sensor.

In an outer mirror device for a vehicle relating to a seventh aspect of the invention, in the outer mirror device for a vehicle of any of the second through sixth aspects, the first case and the second case are integral.

In the outer mirror device for a vehicle of the seventh aspect, the first case which structures the mirror surface angle adjusting mechanism, and the second case which structures the control device, are made integral. Therefore, as compared with a structure in which the first case and the second case are connected or fixed as separate members, the number of places where waterproofing countermeasures are taken is decreased. Moreover, there is no need to make the regions of wire connections within the integrated case (including the connection between the power supplying terminal and the electric motor in the second and third aspects) be waterproof structures.

An outer mirror device for a vehicle relating to an eighth aspect of the present invention comprises: a mirror visor which covers a back surface of a mirror for rearward viewing to form a space between the mirror and the mirror visor; an internal structure, provided in the space, which operates by electricity; and a control device, connected to the internal structure in an electric manner and provided in the space, power-supplying the internal structure on the basis of an operation signal.

DETAILED DESCRIPTION OF THE INVENTION

Figure 1:
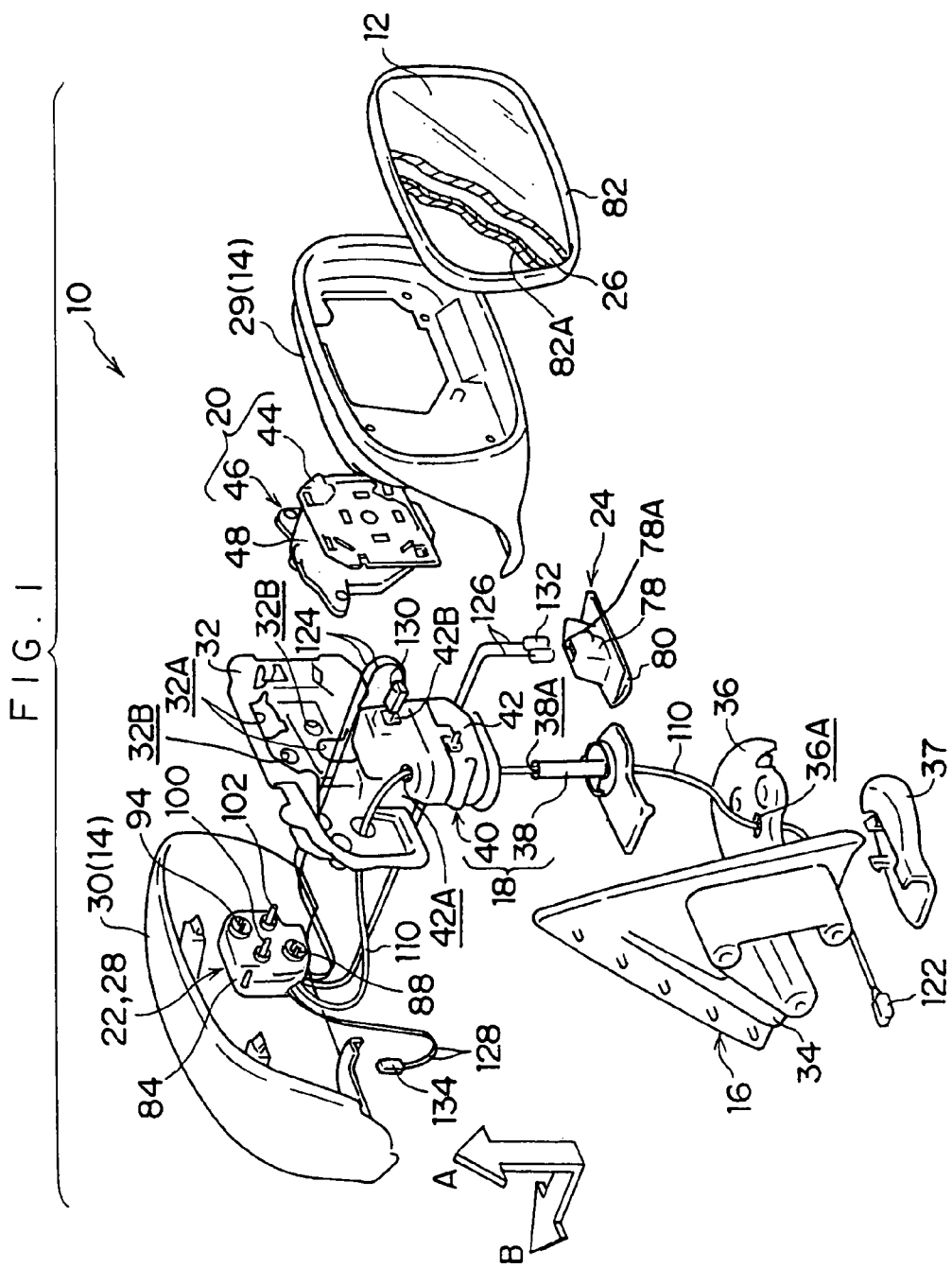
FIG. 1 is an exploded perspective view of an outer mirror device for a vehicle relating to a first embodiment of the present invention.

An outer mirror device 10 for a vehicle relating to a first embodiment of the present invention will be described on the basis of FIGS. 1 through 5. Note that arrow A and arrow B used in the drawings indicate, respectively, the front of the vehicle and the top of the vehicle to which the outer mirror device 10 for a vehicle is mounted.

In FIG. 1, the outer mirror device 10 for a vehicle is shown in exploded perspective view. As shown in FIG. 1, the outer mirror device 10 for a vehicle is structured by the following main structural elements: a mirror 12 for rearward viewing; a door mirror visor 14 covering the reverse surface of the mirror 12; a door mirror stay 16 which is fixed to the vehicle door and rotatably supports the door mirror visor 14; and, serving as an internal mechanisms which are accommodated within the door mirror visor 14: an electrically-driven retracting unit 18; a mirror surface angle adjusting unit 20; a mirror surface angle detecting sensor 22; a foot lamp device 24; and a heater 26; and an ECU 28 which serves as a control device for controlling these respective internal mechanisms.

The door mirror visor 14 corresponds to the mirror visor of the present invention, and is structured by a visor rim 29 substantially formed in the shape of a frame, and a visor cover 30 covering the vehicle front side of the visor rim 29, being joined together. At the door mirror visor 14, the mirror 12 is positioned in a vicinity of the open end at the vehicle rear side of the visor rim 29, such that an internal space which is closed by the mirror 12 is formed (i.e., an internal space is formed between the door mirror visor 14 and the mirror 12). The door mirror visor 14 forms the design of the outer mirror device 10 for a vehicle.

A frame 32 is fixed between the visor rim 29 and the visor cover 30. A through hole 32A, through which connector walls 74, 75 or connector portions 92, 98 (which will be described later) are inserted or pass, and a through hole 32B, through which waterproofing walls 103, 107 (sensor rods 100, 102) pass, and through holes through which various wires are inserted, are formed in appropriate positions of the frame 32.

The door mirror stay 16 is structured to have a fixed portion 34 which is fixed to the vehicle door, and a seat portion 36 which extends sideways from the fixed portion 34. A stand 38, for rotatably supporting the door mirror visor 14 with respect to the door, is fixed to the seat portion 36. A stay under cover 37 is mounted to the lower portion of the seat portion 36 so as to cover the lower portion of the seat portion 36. Note that, in the present first embodiment, the stand 38 is a structural part of the electrically-driven retracting unit 18.

The electrically-driven retracting unit 18 has the aforementioned stand 38 which has a wire hole 38A passing through along the longitudinal direction, and a retracting mechanism portion 40. The retracting mechanism portion 40 has a case 42 having a connector portion 42B and an axial hole 42A passing through the stand 38, and an electric motor, a reduction mechanism, and the like which are accommodated in a waterproof state within the case 42. The retracting mechanism portion 40 rotates around the stand 38 due to supplying power to the electric motor. The case 42 is fixed to the frame 32. Due to the retracting mechanism portion 40 rotating around the stand 38, the door mirror visor 14 (the outer mirror device 10 for a vehicle) moves between a usage position at which the rearward region can be seen by the mirror 12, and a retracted position at which the door mirror visor 14 (the outer mirror device 10 for a vehicle) is folded over along the door.

Figure 2:
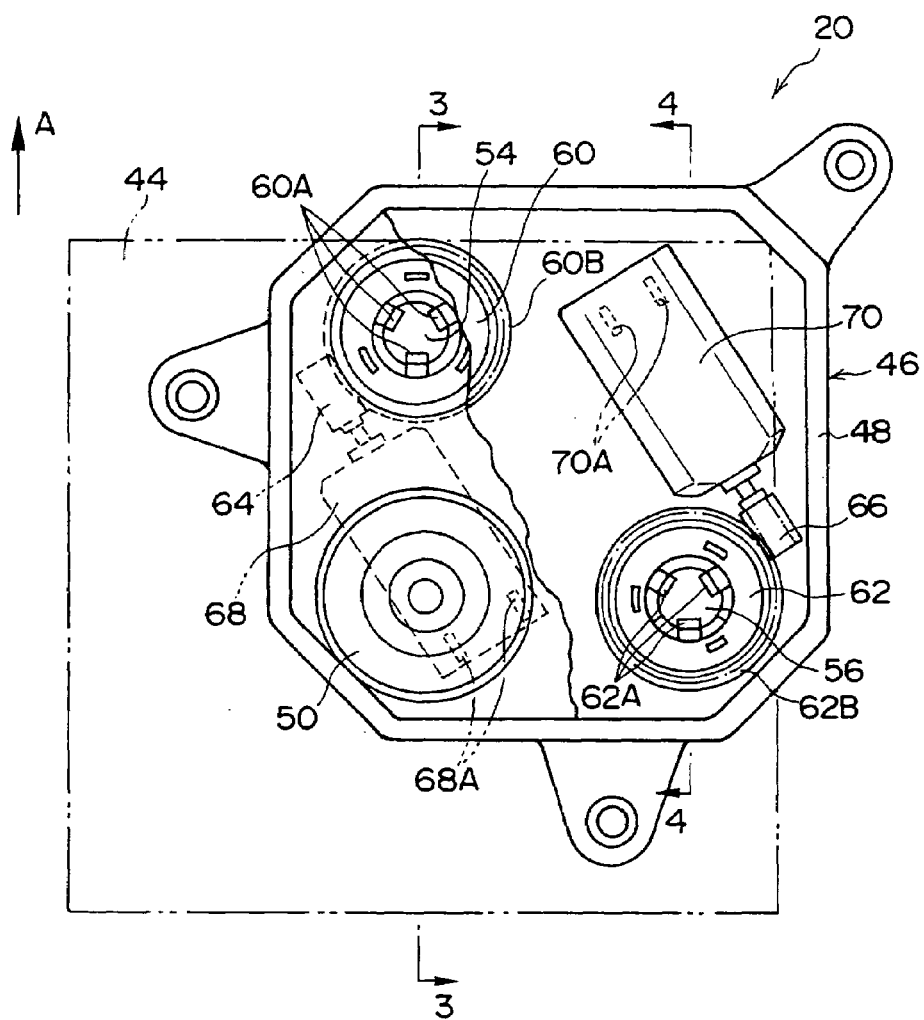
FIG. 2 is a plan view showing mainly a mirror surface angle detecting unit structuring the outer mirror device for a vehicle relating to the first embodiment of the present invention.
Figure 3:
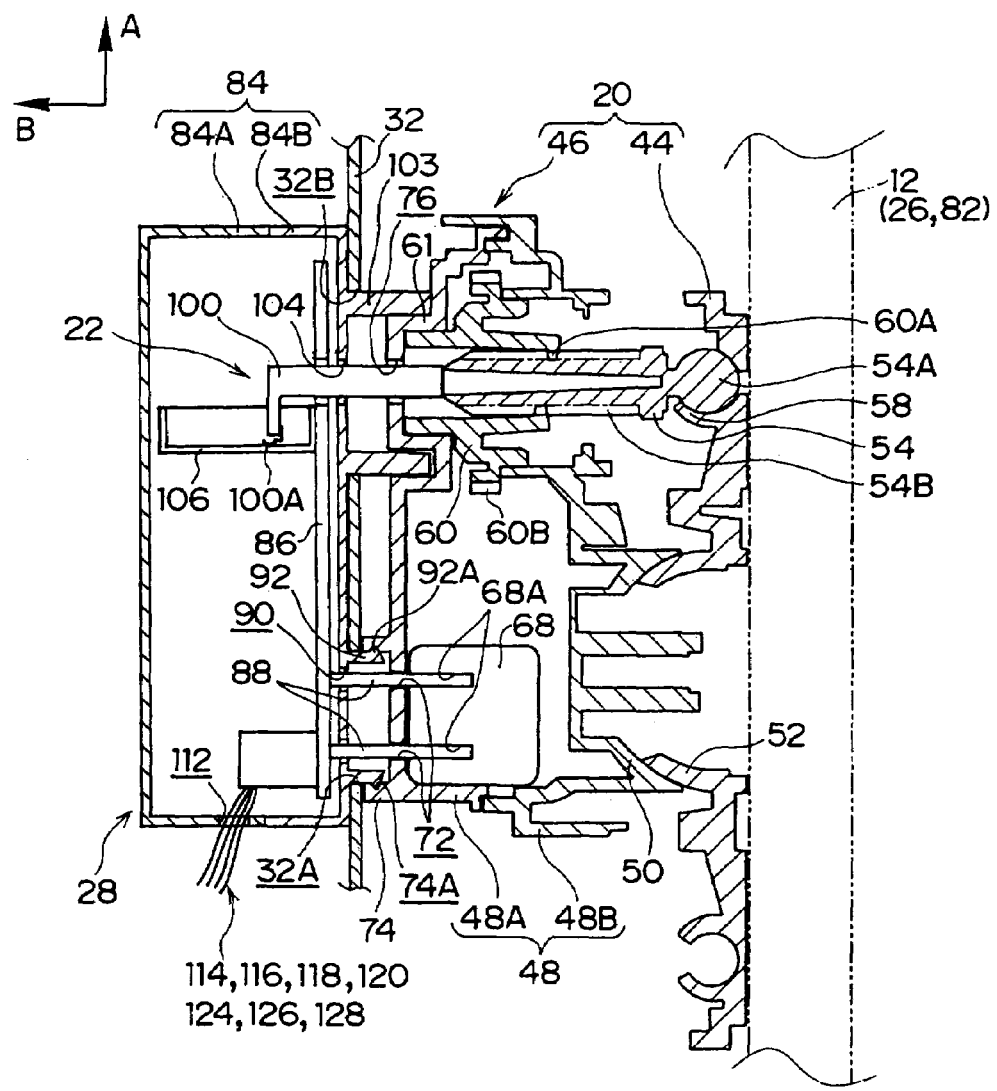
FIG. 3 is a sectional view, as seen along line 3—3 of FIG. 2, of the mirror surface angle detecting unit, a mirror surface angle detecting sensor, and an ECU structuring the outer mirror device for a vehicle relating to the first embodiment of the present invention.
Figure 4:
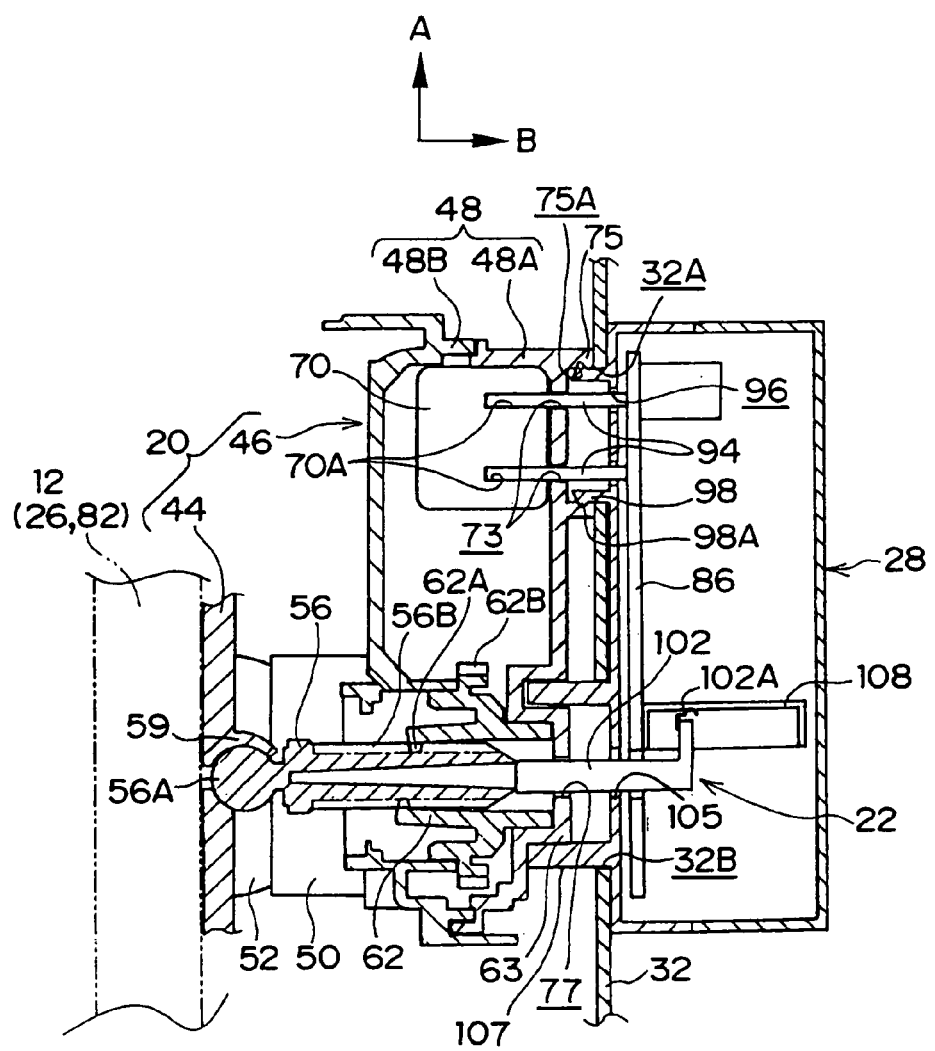
FIG. 4 is a sectional view, as seen along line 4—4 of FIG. 2, of the mirror surface angle detecting unit, the mirror surface angle detecting sensor, and the ECU structuring the outer mirror device for a vehicle relating to the first embodiment of the present invention.

As shown in FIGS. 2 through 4, the mirror surface angle adjusting unit 20 has a substantially flat-plate-shaped mirror holder 44 fixed to the reverse surface side of the mirror 12, and a driving mechanism portion 46 for driving the mirror holder 44.

The driving mechanism portion 46 has a housing 48 which is formed overall in the shape of a substantially flat case and which serves as a first case. The housing 48 is structured by a front housing 48A, which is disposed at the vehicle front side and is fixed to the frame 32, and a rear housing 48B, which is disposed at the vehicle rear side, being joined together. The region at which the front housing 48A and the rear housing 48B are joined together is a waterproof structure. Note that the front housing 48A is fixed to the frame 32 at positions which are different in the cross-sections shown in FIGS. 3 and 4.

The central portion of the mirror holder 44 is swingably supported in a vicinity of a corner portion of the rear housing 48B. Specifically, a pivot portion 50 is recessed in a substantially hemispherical shape at a corner portion of the rear housing 48B. A supporting shaft portion 52, which is formed to project from the central portion of the mirror holder 44 in a substantially hemispherical shape in correspondence with the configuration of the inner surface of the pivot portion 50, is swingably fit together with the pivot portion 50.

Due to a retainer, which is fit-together with the inner surface of the supporting shaft portion 52, and a compression coil spring which urges the retainer toward the supporting shaft portion 52 (neither the retainer nor the compression coil spring is illustrated), the supporting shaft portion 52 is pushed against the pivot portion 50 so as to be unable to fall out. In this way, in the state in which the outer mirror device 10 for a vehicle is assembled to the vehicle, the mirror holder 44 can swing both in the vertical direction and in the horizontal direction with respect to the driving mechanism portion 46. Note that the position at which the mirror holder 44 (i.e., the mirror 12) is held by the pivot portion 50 is the center of gravity of the mirror 12.

The driving mechanism portion 46 has a pair of drive rods 54, 56 serving as drive rods. The drive rods 54, 56 are disposed such that the longitudinal direction (axis) of each of the drive rods 54, 56 substantially coincides with the direction of thickness of the housing 48, and such that, as viewed in that axial direction, imaginary straight lines connecting the axial centers thereof with the axial center of the pivot portion 50 are orthogonal to one another. In the state in which the outer mirror device 10 for a vehicle is assembled to the vehicle, the drive rod 54 is positioned above (or below) the pivot portion 50, and the drive rod 56 is positioned at the side of the pivot portion 50.

As shown in FIG. 3, a distal end portion 54A of the drive rod 54, which distal end portion 54A is formed in a substantially spherical shape, projects out of the housing 48, and is supported (connected) so as to be freely rotatable at a shaft supporting portion 58 formed at the reverse surface side of the mirror holder 44. Further, as shown in FIG. 4, a distal end portion 56A of the drive rod 56, which distal end portion 56A is formed in a substantially spherical shape, is supported (connected) so as to be freely rotatable at a shaft supporting portion 59 formed at the reverse surface side of the mirror holder 44. Feed screws 54B, 56B are formed at the outer surfaces of the drive rods 54, 56, except at these distal end portions.

Feed screw portions 60A, 62A, which are formed at the inner edge portions of drive wheels 60, 62 serving as rotating members, are screwed together with the feed screws 54B, 56B of the drive rods 54, 56. Namely, the feed screws 54B, 56B and the feed screw portions 60A, 62A form feed screw mechanisms. When the drive wheels 60, 62 rotate, the drive rods 54, 56 move in the axial direction.

Within the housing 48, the drive wheels 60, 62 fit together with boss portions 61, 63 provided at the front housing 48A, and are supported so as to be freely rotatable. Further, wheel gears 60B, 62B are formed at the outer peripheral surfaces of the drive wheels 60, 62, respectively. Worms 64, 66 mesh together with these wheel gears 60B, 62B, respectively.

The worm 64 is fixed to the rotating shaft of an electric motor 68 which can rotate forward and reversely. The worm 66 is fixed to the rotating shaft of an electric motor 70 which can rotate forward and reversely. The electric motors 68, 70 are fixed to the floor portion of the front housing 48A in a state of being accommodated within the housing 48. In this way, the driving mechanism portion 46 of the mirror surface angle adjusting unit 20 is structured to include the two electric motors 68, 70.

In accordance with the above structure, at the driving mechanism portion 46, when the electric motor 68 is operated, the drive wheel 60 rotates, the drive rod 54 extends or retracts with respect to the housing 48, and the mirror surface angle, in the up-down (vertical) direction, of the mirror holder 44 (i.e., the mirror 12) is changed. On the other hand, when the electric motor 70 is operated, the drive wheel 62 rotates, the drive rod 56 extends or retracts with respect to the housing 48, and the mirror surface angle, in the left-right (horizontal) direction, of the mirror holder 44 (i.e., the mirror 12) is changed.

Power receiving terminals 68A, 70A are provided at the electric motors 68, 70, respectively. As shown in FIG. 3 and FIG. 4, the power receiving terminals 68A, 70A are exposed to the exterior of the housing 48 from terminal holes 72, 73 which are formed in the front housing 48A. The connector walls 74, 75, which are respectively formed in tubular shapes, stand erect around the terminal holes 72, 73 at the outer surface of the front housing 48A.

Further, as shown in FIG. 3 and FIG. 4, sensor holes 76, 77 are provided coaxially with the drive rods 54, 56 respectively (i.e., on imaginary lines extending in the direction of movement of the drive rod 54, 56) in the floor portions of the bosses 61, 63 of the front housing 48A. The sensor holes 76, 77 are for the passage of the sensor rods 100, 102 (to be described later) of the mirror surface angle detecting sensor 22 which detects the mirror surface angle of the mirror 12. The mirror surface angle detecting sensor 22 will be described later together with the ECU 28.

As shown in FIG. 1, the foot lamp device 24 has a case 78 which accommodates a light bulb or an LED (light emitting diode). A connector portion 78A for supplying power to the light bulb or the LED is provided at the case 78. The opening of the case 78 is closed by a lens 80. The light bulb or the LED is thereby accommodated within the case 78 in a waterproof state.

The lens 80 is fixed to the door mirror visor 14, and forms a portion of the outer surface of the bottom portion of the door mirror visor 14 (i.e., is exposed toward the bottom), and illuminates, toward the region beneath the outer mirror device 10 for a vehicle, the light emitted by the light bulb or the LED. In this way, when the light bulb or the like emits light, the foot lamp device 24 illuminates the region beneath, i.e., the region at the feet of a person who has approached the door.

The heater 26 is formed in the shape of a sheet or in the shape of a thin plate. The heater 26 is mounted so as to be sandwiched between the reverse surface of the mirror 12 and a reverse surface portion 82A of an outer holder 82 which covers the outer peripheral portion and the reverse surface side of the mirror 12. A connector portion (not illustrated) for the supply of power to the heater 26 is formed integrally with the outer holder 82. When the heater 26 is power-supplied, it generates heat and heats the mirror 12. Defrosting of the mirror 12 is thereby carried out. Further, the mirror holder 44 passes through the central opening of the frame-shaped visor rim 29, and is fixed to the reverse surface portion 82A of the outer holder 82.

(ECU, Mirror Surface Angle Detecting Sensor, and Structure of the Connection Between the ECU and the Respective Internal Structures)

As shown in FIGS. 2 and 3 as well, the ECU 28 has an ECU case 84 serving as a second case. The ECU case 84 is structured by a front case 84A, which is disposed at the vehicle front side, and a rear case 84B, which is disposed at the vehicle rear side and is fixed to the frame 32, being joined together. Namely, the ECU case 84 is positioned at the side of the frame 32 opposite the side at which the mirror surface angle adjusting unit 20 (the housing 48) is provided. The region at which the front case 84A and the rear case 84B are joined together is a waterproof structure.

A control substrate 86, at which is provided a control circuit for controlling the above-described respective internal mechanisms, is accommodated in a fixed state within the case 84. The functions of the control circuit will be described later.

Power supplying terminals 88, for supplying power to the electric motor 68 which structures the mirror surface angle adjusting unit 20, are provided at the control substrate 86 (see FIG. 3). The power supplying terminals 88 pass through terminal holes 90 of the rear case 84B, and project to the exterior of the ECU case 84. A connector portion 92, which is formed in a tubular shape, stands erect around the terminal holes 90 at the outer surface of the rear case 84B. The connector portion 92 fits together with the connector wall 74 of the housing 48. In this fit-together state, the power supplying terminals 88 are inserted in the power receiving terminals 68A of the electric motor 68, such that the control substrate 86 (the control circuit) and the electric motor 68 are electrically connected. Further, the region at which the connector portion 92 and the connector wall 74 are fit-together is a waterproof structure.

Power supplying terminals 94, for supplying power to the electric motor 70 which structures the mirror surface angle adjusting unit 20, are provided at the control substrate 86 (see FIG. 4). The power supplying terminals 94 pass through terminal holes 96 of the rear case 84B, and project to the exterior of the ECU case 84. A connector portion 98, which is formed in a tubular shape, stands erect around the terminal holes 96 at the outer surface of the rear case 84B. The connector portion 98 fits together with the connector wall 75 of the housing 48. In this fit-together state, the power supplying terminals 94 are inserted in the power receiving terminals 70A of the electric motor 70, such that the control substrate 86 (the control circuit) and the electric motor 70 are electrically connected. Further, the region at which the connector portion 98 and the connector wall 75 are fit-together is a waterproof structure.

In the present first embodiment, the connector portions 92, 98 are fit-together with the inner surfaces of the connector walls 74, 75. Engaging claws 92A, 98A, which project partially in the peripheral direction from the outer surfaces of the connector portions 92, 98, enter into engaging concave portions 74A, 75A formed in recessed manners in the inner surfaces of the connector walls 74, 75. The power supplying terminals 88, 94 and the power receiving terminals 68A, 70A coming apart from one another is thereby impeded. Further, the connector portion 92 and the connector wall 74, and the connector portion 98 and the connector wall 75, are fit-together through the through hole 32A of the frame 32.

FIGS. 3 and 4 show different cross-sectional positions at the electric motors 68, 70, in order to illustrate the state of connection of the power supplying terminals 88, 94 to the power receiving terminals 68A, 70A.

The mirror surface angle detecting sensor 22 is accommodated within the ECU case 84. The mirror surface angle detecting sensor 22 has the pair of sensor rods 100, 102 which follow the drive rods 54, 56, respectively. The sensor rod 100 is disposed so as to be inserted through a sensor hole 76, a sensor hole 104 formed in the rear case 84B in correspondence with the sensor hole 76, and the through hole 32B of the frame 32. The distal end of the sensor rod 100 abuts the end portion of the drive rod 54 at the side thereof opposite the distal end portion 54A. The sensor rod 100 is movably supported (not illustrated) at both axial direction sides thereof, and is urged by an unillustrated spring in a direction of abutting the drive rod 54. In this way, as described above, the sensor rod 100 can follow the axial direction movement of the drive rod 54.

In a state in which, in the same way as the sensor rod 100, the sensor rod 102 is inserted through a sensor hole 77, a sensor hole 105 of the rear case 84B, and the through hole 32B of the frame 32 and the distal end of the sensor rod 102 abuts the drive rod 56, the sensor rod 102 is supported so as to be movable in the axial direction, and is urged toward the drive rod 56, and can follow the axial direction movement of the drive rod 56. Note that the tubular waterproofing walls 103, 107, which fit-together with the outer peripheral surfaces of the boss portions 61, 63 of the housing 48, are provided at the rear case 84B of the ECU case 84, and prevent water from entering in from the sensor holes 76, 77, 104, 105.

A sliding contact 100A for up/down is provided at the end portion of the sensor rod 100 at the side opposite the drive rod 54. A sliding contact 102A for left/right is provided at the end portion of the sensor rod 102 at the side opposite the drive rod 56. The mirror surface angle detecting sensor 22 has sensor substrates 106, 108 which the sliding contact 100A for up/down and the sliding contact 102A for left/right slidingly contact, respectively. The sensor substrates 106, 108 are provided along the moving direction of the sensor rods 100, 102, and are fixed to the control substrate 86.

Figure 5:
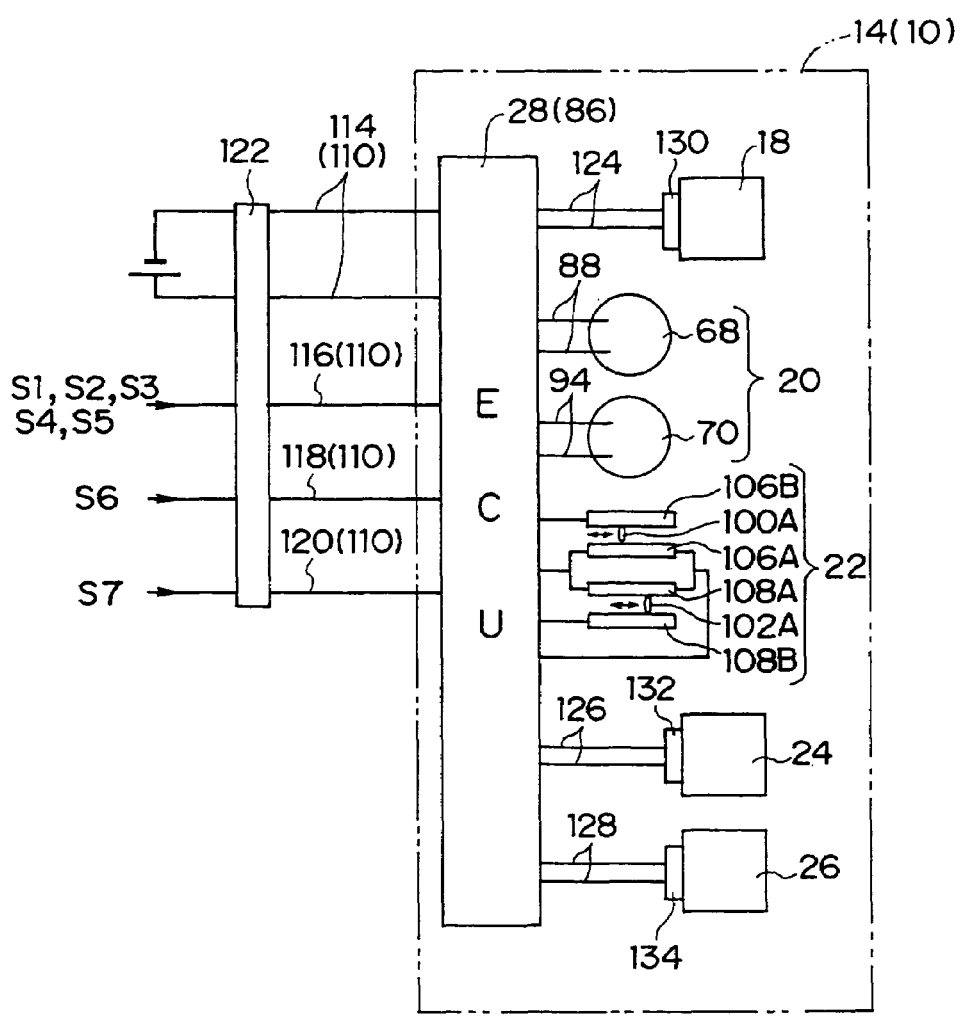
FIG. 5 is a schematic block diagram showing the state of electrical connection between respective internal mechanisms and the ECU structuring the outer mirror device for a vehicle relating to the first embodiment of the present invention.

As shown schematically in FIG. 5, a resistor 106A for up/down and a fixed contact 106B, whose longitudinal directions are the moving direction of the sensor rod 100, are provided at the sensor substrate 106 in a state of being electrically insulated from one another. The sliding contact 100A for up/down slidingly contacts both the resistor 106A for up/down and the fixed contact 106B. In this way, as the sensor rod 100 moves, the sliding contact 100A for up/down slides along both the resistor 106A for up/down and the fixed contact 106B (i.e., the state of contact therebetween is maintained). Moreover, in the same away as at the sensor substrate 106, a resistor 108A for left/right and a fixed contact 108B, along which the sliding contact 102A for left/right slides as the sensor rod 102 moves, are provided at the sensor substrate 108.

The control substrate 86 to which the sensor substrates 106, 108 are mounted electrically applies a constant voltage (the input voltage) to both ends of the resistors 106A for up/down and 108A for left/right, and detects the voltage (the output voltage) between the resistors 106A for up/down and 108A for left/right and the fixed contacts 106B, 108B (i.e., the sliding contact 100A for up/down, the sliding contact 102A for left/right).

In this way, the mirror surface angle detecting sensor 22 is a rectilinear type potentiometer, and is electrically connected to the control substrate 86 of the ECU 28 without providing wires. In the mirror surface angle detecting sensor 22, when the sensor rod 100 moves following the movement of the drive rod 54, the output voltage (the ratio of the output voltage and the input voltage) between the sliding contact 100A for up/down and the resistor 106A for up/down changes. The angle of the mirror surface of the mirror 12 in the up/down direction is detected on the basis of this change in the voltage. Further, when the sensor rod 102 moves following the movement of the drive rod 56, the output voltage (the ratio of the output voltage and the input voltage) between the sliding contact 102A for left/right and the resistor 108A for left/right changes, and the angle of the mirror surface of the mirror 12 in the left/right direction is detected on the basis of this change in the voltage.

Further, as shown in FIG. 1, five wires are led into the interior of the ECU case 84 of the ECU 28, i.e., into the door mirror visor 14. The five wires are bundled together and covered so as to form a wire harness 110. The wire harness 110 passes through the fixed portion 34 of the door mirror stay 16, the through hole 36A of the seat portion 36, the stand 38 (the axial hole 42A of the electrically-driven retracting unit 18), and a through hole of the frame 32, and reaches the ECU case 84.

Then, as shown in FIG. 3, in a vicinity of the ECU case 84, the covering is removed, and the five wires are led into the ECU case 84 from a wire hole 112 provided in the peripheral wall of the front case 84A, and are connected to the control substrate 86. The region between the wire hole 112 and the respective wires is made waterproof by a grommet or the like. As shown in FIG. 5, the five wires are as follows: two power source wires 114, and signal wires 116, 118, 120. A connector 122 for electrical connection with the vehicle is provided at the end portions of the power source wires 114 and the signal wires 116, 118, 120 (i.e., the wire harness 110), which end portions are positioned outside of the door mirror visor 14.

On the other hand, from the ECU case 84, six wires pass through and are led out of the through hole 112 in a state of being made waterproof by a grommet or the like. Among these six wires, two are power supply wires 124 for supplying power to the electric motor of the electrically-driven retracting unit 18, another two are power supply wires 126 for supplying power to the foot lamp device 24, and the remaining two are power supply wires 128 for supplying power to the heater 26. Respective one end portions of the power supply wires 124, 126, 128 are connected to the control substrate 86, and waterproof connectors 130, 132, 134 are connected to the other end portions, respectively.

The waterproof connector 130 is connected to the connector portion 42B of the electrically-driven retracting unit 18. The waterproof connector 132 is connected to the connector portion 78A of the foot lamp device 24. The waterproof connector 134 is connected to an unillustrated connector portion of the heater 26 (the outer holder 82).

As described above, the ECU 28 (the control substrate 86) is electrically connected as shown in FIG. 5. Further, the control circuit provided at the control substrate 86 of the ECU 28 controls the respective internal mechanisms on the basis of signals inputted from the signal wires 116, 118, 120. Note that, in FIG. 5, the number of wires connecting between the ECU 28 and the respective internal mechanisms corresponds to the 14 wires at the conventional outer mirror device 200 for a vehicle.

Specifically, a retracting signal S1 retracting the outer mirror device 10 for a vehicle, a visor returning signal S2 returning the outer mirror device 10 for a vehicle from the aforementioned retracted state to the usage position, an adjusting signal S3 adjusting the up/down or left/right mirror surface angle of the mirror 12, a storage instructing signal S4 requesting that the mirror surface angle of the mirror 12 be stored, and a mirror returning signal S5 returning the mirror 12 to the stored mirror surface angle, are inputted from the signal wire 116 to the ECU 28.

A lamp operating signal S6 illuminating the region beneath the door mirror visor 14 is inputted to the ECU 28 from the signal wire 118. A defogging signal S7 removing frost or water droplets which have adhered to the mirror 12 is inputted to the ECU 28 from the signal wire 120.

Next, operation of the present first embodiment will be described.

At the time when the outer mirror device 10 for a vehicle having the above-described structure is positioned at the usage position for example, when a retracting switch disposed in a vicinity of the driver's seat is operated and the retracting signal S1 is inputted to the ECU 28, the ECU 28 supplies power to the electrically-driven retracting unit 18 such that the electric motor is driven forward. Thus, the electrically-driven retracting unit 18 is operated, and the outer mirror device 10 for a vehicle is moved to the retracted position. On the other hand, when, for example, from this retracted state the retracting switch is operated and the visor returning signal S2 is inputted to the ECU 28, the ECU 28 supplies power to the electrically-driven retracting unit 18 such that the electric motor is driven reversely. Thus, the electrically-driven retracting unit 18 is operated in the direction opposite the direction at the time of retracting, and returns the outer mirror device 10 for a vehicle to the usage position.

In the outer mirror device 10 for a vehicle, when, for example, a mirror adjusting switch disposed in a vicinity of the driver's seat is operated and the adjusting signal S3 is inputted to the ECU 28, the ECU 28, in accordance with the adjusting signal S3 (the intent of the operator to adjust the mirror 12) supplies power to the mirror surface angle adjusting unit 20 such that the electric motor 68 or the electric motor 70 is appropriately rotated forward or rotated reversely. In this way, the mirror 12 is adjusted to the desired mirror surface angle by the mirror surface angle adjusting unit 20.

In the outer mirror device 10 for a vehicle, when, for example, a mirror surface angle storing switch or a seat position storing switch is operated and the storage instructing signal S4 is inputted to the ECU 28, the ECU 28 stores the mirror surface angle of the mirror 12 which the mirror surface angle detecting sensor 22 is actually detecting (the output voltage between the sliding contact 100A for up/down and the resistor 106A for up/down, and the output voltage between the sliding contact 102A for left/right and the resistor 108A for left/right).

In the state in which the mirror surface angle of the mirror 12 is stored, if, for example, a mirror surface angle returning switch or a seat position returning switch is operated and the mirror returning signal S5 is inputted to the ECU 28, the ECU 28 supplies power to the mirror surface angle adjusting unit 20 such that the electric motor 68 or the electric motor 70 is rotated forward or rotated reversely. In this way, the mirror 12 is returned to the stored mirror surface angle by the mirror surface angle adjusting unit 20.

Further, in the outer mirror device 10 for a vehicle, when, for example, the lamp operation signal S6 is inputted to the ECU 28 accompanying a remote operation of releasing the door lock from the vehicle exterior, the ECU 28 supplies power to the foot lamp device 24. In this way, the light bulb or the LED of the foot lamp device 24 emits light, and the region beneath the door mirror visor 14, i.e., the feet of a person who is about to get into the vehicle, are illuminated.

At the outer mirror device 10 for a vehicle, when, for example, a heater switch disposed in a vicinity of the driver's seat is operated when it is rainy or the like and the fog stopping signal S7 is inputted to the ECU 28, the ECU 28 supplies power to the heater 26. In this way, the heater 26 generates heat and heats the mirror 12, such that the frost or water droplets or the like adhering to the surface of the mirror 12 are removed.

Here, the ECU 28 is disposed at the interior of the door mirror visor 14 (i.e., in the space formed by the door mirror visor 14 and the mirror 12). Therefore, it suffices for the number of wires led into the door mirror visor 14 from the vehicle body to be merely a total of five which are the two power source wires 114 and the three signal wires 116, 118, 120 respectively connected to the control substrate 86 of the ECU 28. This is a great reduction from the 14 wires of the conventional outer mirror device 200 for a vehicle having the same internal mechanisms. In this way, more internal mechanisms can be disposed within the door mirror visor 14 while the inner diameter of the stand 38 for leading the wires into the door mirror visor 14 is maintained, that is, is not necessary to be changed. (The inner diameter of the stand 38 is a dimension based on requirements relating to strength, other functions, lightening of the weight, and the like.)

Further, it suffices for control device, which is disposed within the vehicle door and conventionally also controls the internal mechanisms of the outer mirror device 10 for a vehicle, to carry out only control for mechanisms at the door, such as the power window or the like. Therefore, there is no need for exclusively designing the control device in accordance with the specifications of the outer mirror device for a vehicle, that is, the number and types of the built-in internal mechanisms for each of specifications of vehicle types or the same vehicle type. Therefore, the control device at the door can be used in common, regardless of the specifications (the types and number of built-in internal mechanisms) of the outer mirror device 10 for a vehicle.

In this way, in the outer mirror device 10 for a vehicle relating to the present first embodiment, the number of wires which are led in from the vehicle body to the interior of the door mirror visor 14 can be reduced. Moreover, other internal structures can be accommodated within the door mirror visor 14 without changing the stand 38.

The power supplying terminals 88, 94 are connected to the power receiving terminals 68A, 70A due to the fitting-together of the connector walls 74, 75 of the housing 48 structuring the mirror surface angle adjusting unit 20, and the connector portions 92, 98 of the ECU case 84 structuring the ECU 28. In other words, due to the operation of fixing the ECU case 84 and the housing 48 to predetermined positions of the frame 32 respectively, the ECU case 84 and the housing 48 are joined together, and the control substrate 86 and the electric motors 68, 70 are electrically connected. Therefore, there is no need for work for wiring the mirror surface angle adjusting unit 20 and the ECU 28. Specifically, the work for connecting the wire 232 to the mirror surface angle adjusting unit 210 by the waterproof connector 234, which was needed in the conventional art, is unnecessary. Moreover, the waterproof connector 234 itself is not needed, and the parts costs can be reduced. Assembly costs can be reduced as the aforementioned wire connecting work is done away with. The cost of the outer mirror device 10 for a vehicle can thereby be reduced. In addition, the wire 232 is not needed, and the space for the laying of wires within the door mirror visor 14 can be reduced.

The mirror surface angle detecting sensor 22 is provided within the ECU case 84. Therefore, there is no need for an exclusive case, which accommodates the mirror surface angle detecting sensor 22 (the sliding contact 100A for up/down, the sensor substrate 108, and the like) and which prevents entry of water (i.e., a case corresponding to the conventional case 212A), nor is there the need for work for fixing such an exclusive case within the door mirror visor 14. In this way, the number of places within the mirror visor at which waterproofing countermeasures are taken is reduced, and there is no need for the waterproof connector (i.e., a connector corresponding to the waterproof connector 238) nor for the wire 236 which were conventionally needed. Namely, in accordance with this as well, the parts costs and the assembly costs can be reduced, and the cost of outer mirror device 10 for a vehicle can thereby be reduced. The space for the laying of wires within the door mirror visor 14 can be reduced. Moreover, the sensor substrates 106, 108 are mounted to the control substrate 86 and structure the mirror surface angle detecting sensor 22. Therefore, there is no need for work for wire-connecting the control substrate 86 and the mirror surface angle detecting sensor 22 within the ECU case 84 (i.e., there is no need for the fitting-together of connectors or the like).

The mirror surface angle detecting sensor 22 detects the mirror surface angle of the mirror 12 by the sensor rods 100, 102 following the movement of the drive rods 54, 56. Therefore, as compared with a structure in which the mirror surface angle is detected by the sensor rod 212B following the mirror holder 210B as in the conventional art, the accuracy of detecting the mirror surface angle is high. Namely, in the conventional mirror surface angle detecting sensor 212, the mirror surface angle is detected while the angle of abutment of the sensor rod 212B with respect to the mirror holder 210B (more accurately, the region of abutment) is changed accompanying the change in the mirror surface angle. Therefore, the relationship between the mirror surface angle (the displacement of the sensor rod 212B) and the output voltage is not linear, and there is a slight dispersion in the detection accuracy depending on the mirror surface angle (the position of the sensor rod 212B). However, in the mirror surface angle detecting sensor 22, the sensor rods 100, 102 are disposed coaxially with the drive rods 54, 56 and move along these coaxial straight lines and follow the axial direction movement of the drive rods 54, 56 (the state of abutment is maintained without the posture varying). Therefore, the relationship between the mirror surface angle and the output voltage is linear, and the detection accuracy is high. In particular, in a case in which these results of detection are stored and the mirror 12 is returned to the stored mirror surface angle, the accuracy of returning the mirror 12 to the stored position (mirror surface angle) is high. In addition, as mentioned above, there is no change in posture in the state of abutment of the sensor rods 100, 102 and the drive rods 54, 56. Therefore, there is no need, as there was conventionally, to provide, at the distal ends of the sensor rods 100, 102, balls or the like which roll freely and which permit changes in the angle of abutment with the mirror holder. The structure of the sensor rods 100, 102, i.e., the mirror surface angle detecting sensor 22, is simple. In this way, the cost of the mirror surface angle detecting sensor 22, i.e., the outer mirror device 10 for a vehicle, can be reduced.

(Other Embodiments)

Next, the mirror surface angle adjusting units, the mirror surface angle detecting sensors, and the ECUs structuring the outer mirror devices for a vehicle relating to other embodiments of the present invention will be described. Note that parts and portions which are basically the same as the parts and portions of the above first embodiment or which were previously described are denoted by the same reference numerals as those parts and portions of the above first embodiment or which were previously described, and description thereof is omitted. Further, the electric motor and the drive rods and the like, the sensor rods and the like, and the peripheral structures thereof and the like for left/right, and the electric motor and the drive rods and the like, the sensor rods and the like, and the peripheral structures thereof and the like for up/down, in the mirror surface angle adjusting unit, the mirror surface angle detecting sensor, and the ECU, have basically the same structures. Therefore, in the other embodiments which will be described hereinafter, the respective structural parts for up/down will be described and illustrated. For the respective structural parts for left/right, their reference numerals will be given in parentheses near the reference numerals of the corresponding respective structural parts for up/down.

(Second Embodiment)

Figure 6:
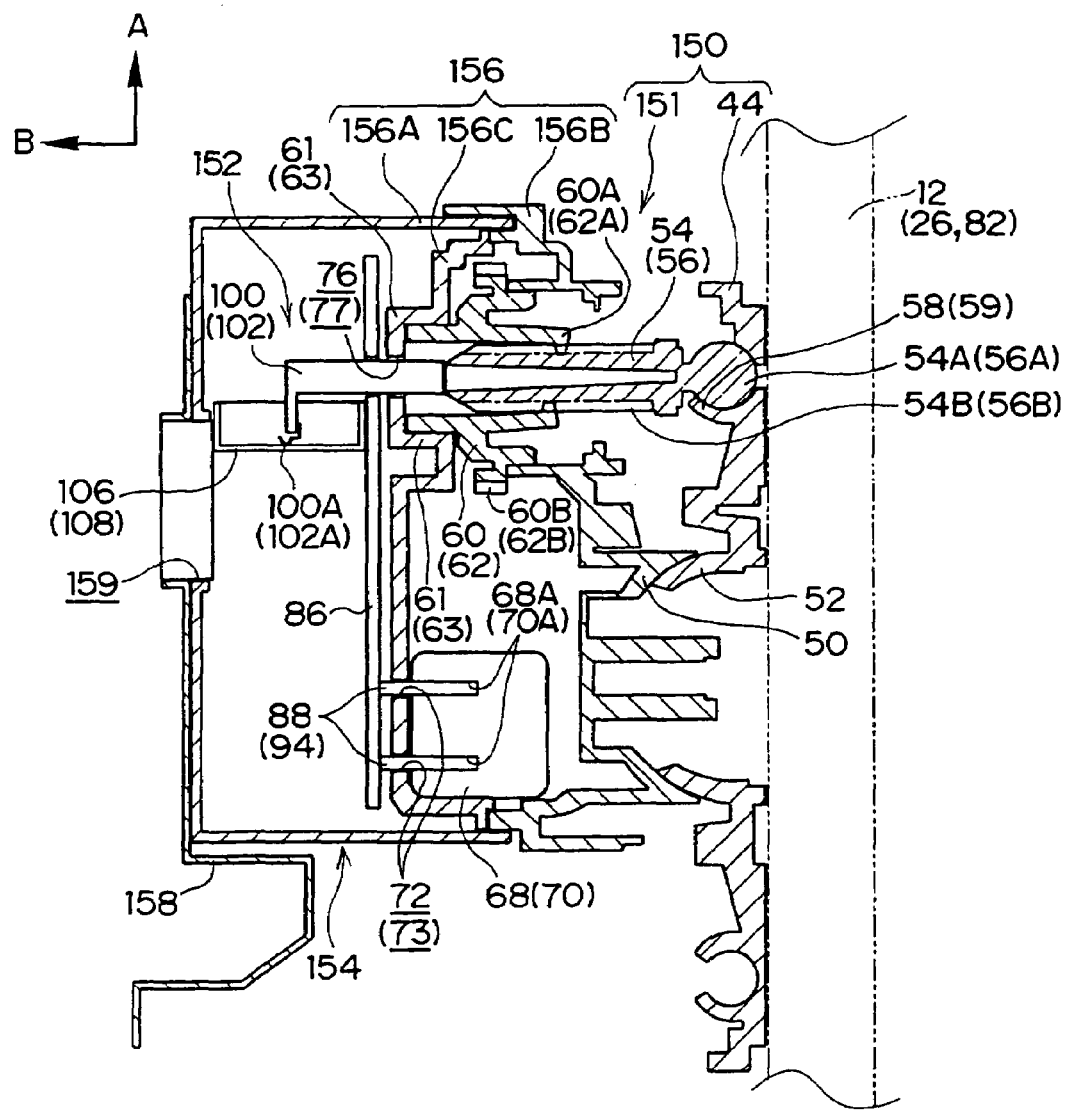
FIG. 6 is a diagram corresponding to FIG. 3 and showing a mirror surface angle detecting unit, a mirror surface angle detecting sensor, and an ECU structuring an outer mirror device for a vehicle relating to a second embodiment of the present invention.

A mirror surface angle adjusting unit 150, a mirror surface angle detecting sensor 152, and an ECU 154 structuring an outer mirror device for a vehicle relating to a second embodiment of the present invention are illustrated in FIG. 6 in a cross-sectional view which corresponds to FIG. 3. As shown in FIG. 6, the outer mirror device for a vehicle relating to the second embodiment differs from the outer mirror device 10 for a vehicle with regard to the point that a driving mechanism portion 151, a mirror surface angle detecting sensor 152 and an ECU 154 which structure the mirror surface angle adjusting unit 150 have a common unit case 156. Details will be described hereinafter.

The unit case 156 is structured by a front case 156A, which is disposed at the vehicle front side and is fixed to a frame 158, and a rear case 156B, which is disposed at the vehicle rear side, being joined together. The rear case 156B has substantially the same configuration as that of the rear housing 48B relating to the above-described first embodiment, and has the pivot portion 50 for swingably supporting the mirror holder 44. Note that through holes corresponding to the through holes 32A, 32B of the frame. 32 are not formed in the frame 158.

The unit case 156 has an inner case 156C. The inner case 156C has substantially the same configuration as that of the front housing 48A relating to the above-described first embodiment, and has the boss portions 61, 63 (the sensor holes 76, 77) rotatably supporting the drive wheels 60, 62, the holding structures of the electric motors 68, 70, and the terminal holes 72, 73. Namely, the rear case 156B and the inner case 156C correspond to the first case of the present invention. Therebetween, the electric motors 68, 70, the drive wheels 60, 62, and (portions of) the drive rods 54, 56 are accommodated so as to structure the driving mechanism portion 151 of the mirror surface angle adjusting unit 150.

On the other hand, the inner case 156C differs from the front housing 48A with regard to the point that the portion abutting the rear case 156B is not made to be a waterproof structure, and the connector walls 74, 75 are not provided. At the unit case 156, the region at which the front case 156A and the rear case 156B are joined together is a waterproof structure. Moreover, by fixing the front case 156A to the frame 158, the unit case 156 is disposed on the whole at the vehicle rear side of the frame 158.

Therefore, a space is formed at the vehicle front side (the direction A side) of the frame 158 within the door mirror visor 14. A wire hole 159 is formed in the front surface of the front case 156A. Although unillustrated, the two power source wires 114 and the three signal wires 116, 118, 120 are led from the wire hole 159 into the unit case 156 in a state of being made waterproof by a grommet or the like, and the total of six power supply wires 124, 126, 128 are led out to the exterior of the unit case 156 from the wire hole 159 in a state of being made waterproof by a grommet or the like.

Moreover, the control substrate 86 is disposed in a fixed state between the front case 156A and the inner case 156C. The power supplying terminals 88, 94 and the sensor substrates 106, 108 are provided at the control substrate 86. In the state in which the unit case 156 is assembled, the power supplying terminals 88, 94 are in a state of being connected to (inserted in) the respective power receiving terminals 68A, 70A of the electric motors 68, 70. In addition, between the front case 156A and the inner case 156C, the sensor rods 100, 102, which project out from the sensor holes 76, 77 and abut the drive rods 54, 56, are supported so as to be movable in the axial direction, and are urged by unillustrated springs in a direction of following the axial direction movement of the drive rods 54, 56.

Namely, the front case 156A and the inner case 156C correspond to the second case of the present invention. Therebetween, the control substrate 86 is accommodated so as to structure the ECU 154. Further, therebetween, the sensor rods 100, 102 (the sliding contact 100A for up/down and the sliding contact 102A for left/right) and the sensor substrates 106, 108 are accommodated so as to structure the mirror surface angle detecting sensor 152.

The outer mirror device for a vehicle relating to the present second embodiment is electrically structured exactly the same as the outer mirror device 10 for a vehicle relating to the above-described first embodiment (i.e., has the structure shown in FIG. 5). Namely, in the outer mirror device for a vehicle having the mirror surface angle adjusting unit 150, the mirror surface angle detecting sensor 152 and the ECU 154, the exact same operations and effects as in the outer mirror device 10 for a vehicle are exhibited.

Moreover, in the outer mirror device for a vehicle relating to the present second embodiment, the mirror surface angle adjusting unit 150, the mirror surface angle detecting sensor 152, and the ECU 154 have the unit case 156 in common. In other words, the unit case 156 is structured as if the housing 48 and the ECU case 84 were made to be integral. Therefore, the number of places at which waterproofing countermeasures are taken is reduced as compared with a structure in which each of the housing 48 and the ECU case 84 are made to be waterproof structures. Specifically, it suffices for only the region where the front case 156A and the rear case 156B are joined together to be made to be a waterproof structure. The number of places at which waterproofing countermeasures are taken is greatly reduced as compared with a structure in which the joined-together region of the front housing 48A and the rear housing 48B, the joined-together region of the front case 84A and the rear case 84B, the fit-together regions of the connector walls 74, 75 and the connector portions 92, 98 (or the conventional waterproof connector 234), and the fit-together regions of the boss portions 61, 63 and the waterproof walls 103, 107 (or the conventional waterproof connector 238), are respectively made to be waterproof structures.

(Third Embodiment)

Figure 7:
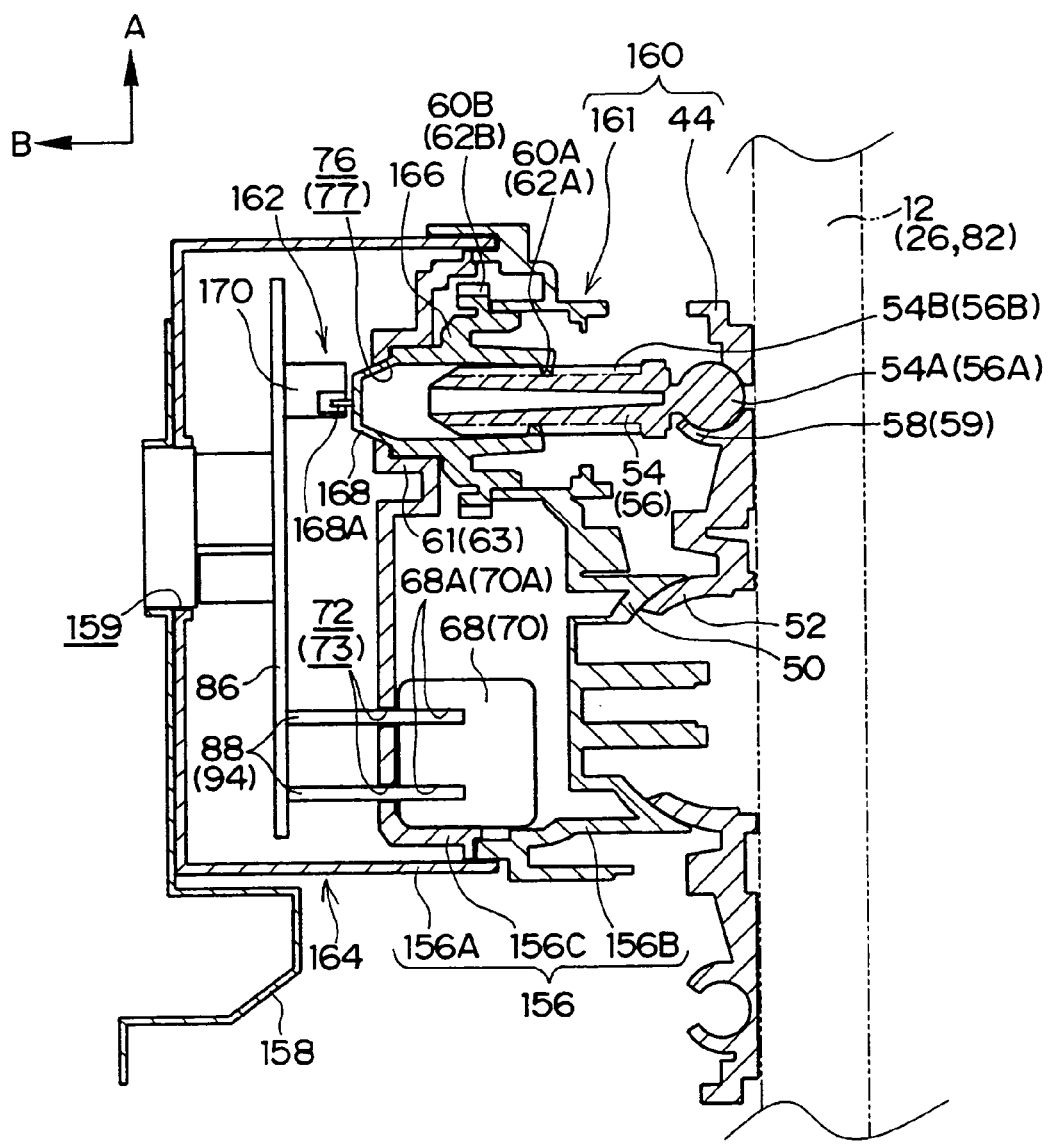
FIG. 7 is a diagram corresponding to FIG. 3 and showing a mirror surface angle detecting unit, a mirror surface angle detecting sensor, and an ECU structuring an outer mirror device for a vehicle relating to a third embodiment of the present invention.

A mirror surface angle adjusting unit 160, a mirror surface angle detecting sensor 162, and an ECU 164 structuring an outer mirror device for a vehicle relating to a third embodiment of the present invention are illustrated in FIG. 7 in a cross-sectional view which corresponds to FIG. 3. As shown in FIG. 7, the outer mirror device for a vehicle relating to the third embodiment is the same as the above-described outer mirror device for a vehicle relating to the second embodiment with regard to the point that a driving mechanism portion 161, the mirror surface angle detecting sensor 162, and the ECU 164 structuring the mirror surface angle adjusting unit 160 are provided with the common unit case 156. However, the outer mirror device for a vehicle relating to the third embodiment differs from the first and second embodiments with regard to the point that the mirror surface angle detecting sensor 162 detects the rotation of a drive wheel 166. Details will be described hereinafter.

In place of the drive wheels 60, 62, the driving mechanism portion 161 has the drive wheels 166 (the same reference numeral is used for both for the drive wheel for up/down and the drive wheel for left/right) which screw together with the drive rods 54, 56 and which mesh together with the worms 64, 66. Namely, the drive wheel 166 has the feed screw portion 60A (62A) and the wheel gear 60B (62B).

The drive wheels 166 have contact holding portions 168 which are inserted through the sensor holes 76, 77 and project further toward the front case 156A than the inner case 156C. A sliding contact 168A for up/down or left/right is provided at a position at the contact holding portion 168 of each drive wheel 166, which position is eccentric with respect to the axial center. The sliding contact 168A is a structural part of the mirror surface angle detecting sensor 162.

The mirror surface angle detecting sensor 162 has a rotating-type potentiometer 170 at which are provided a fixed contact and a resistor (both of which are annular and neither of which is illustrated) which the sliding contact 168A contacts as the drive wheel 166 rotates. The rotating-type potentiometer 170 of the mirror surface angle detecting sensor 162 detects the rotational position of the drive wheel 166, i.e., the up/down direction or the left/right direction mirror surface angle of the mirror 12, by the output voltage between the fixed contact (the sliding contact 168A) and one end portion of the resistor to whose both ends a constant voltage is being applied. In the present third embodiment, a multiple rotation type potentiometer (and preferably a trimmer potentiometer) is used. Accordingly, the electrical connection of the mirror surface angle detecting sensor 162 is exactly the same as that of the mirror surface angle detecting sensor 22.

The rotating-type potentiometer 170 which structures the mirror surface angle detecting sensor 162 is mounted to the control substrate and is also electrically connected thereto. Other structures of the outer mirror device for a vehicle relating to the present third embodiment are exactly the same as those of the outer mirror device for a vehicle relating to the above-described second embodiment.

Accordingly, the outer mirror device for a vehicle having the mirror surface angle adjusting unit 160, the mirror surface angle detecting sensor 162, and the ECU 164 exhibits the exact same operations and effects as those of the outer mirror device for a vehicle relating to the above-described second embodiment. It goes without saying that, in the mirror surface angle detecting sensor 162, in the same way as in the mirror surface angle detecting sensor 22, the posture of contact of the sliding contact 168A and the fixed contact or the like does not change, and the accuracy of detection of the mirror surface angle and the accuracy of return to the stored mirror surface angle are high.

Moreover, in the outer mirror device for a vehicle relating to the above-described second embodiment, the mirror surface angle detecting sensor 162 is structured so as to include the rotating-type potentiometer 170. Therefore, there is no need to provide the sensor rod 100 and the like which follow the movement of the drive rod 54 and the like, and no need to provide the sensor substrate 106 and the like disposed along that direction of movement. As a result, the electrical connection of the control circuit on the control substrate 86 and the mirror surface angle detecting sensor 162 (the electrical connection before assembly into the unit case 156) is even easier, and the common unit case 156 can be made to have a compact design. In addition, by making the unit case 156 compact, the space at which it is possible to set internal mechanisms within the door mirror visor 14 is broadened, and it is possible to provide even more internal mechanisms in the door mirror visor.

(Fourth Embodiment)

Figure 8:
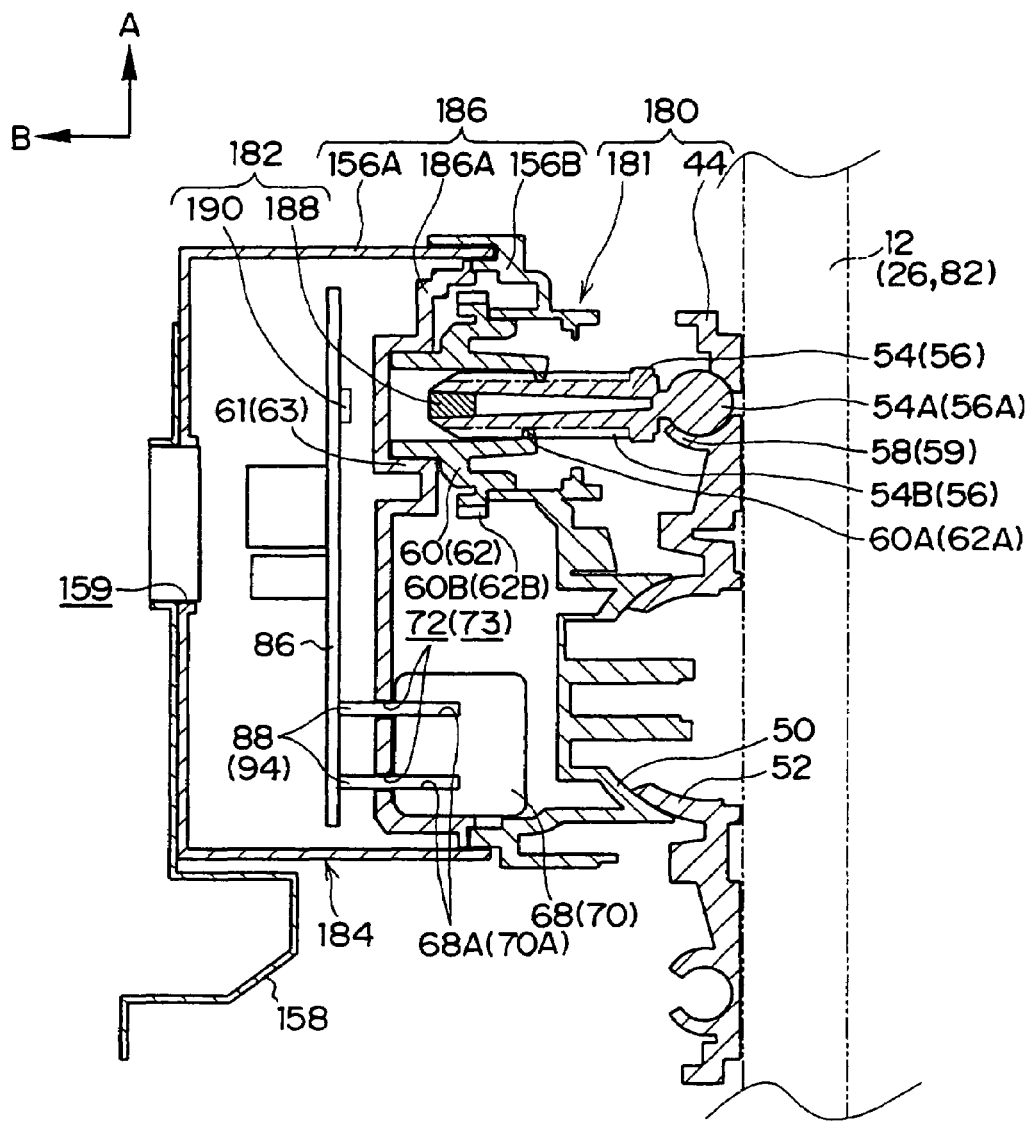
FIG. 8 is a diagram corresponding to FIG. 3 and showing a mirror surface angle detecting unit, a mirror surface angle detecting sensor, and an ECU structuring an outer mirror device for a vehicle relating to a fourth embodiment of the present invention.
Figure 9:
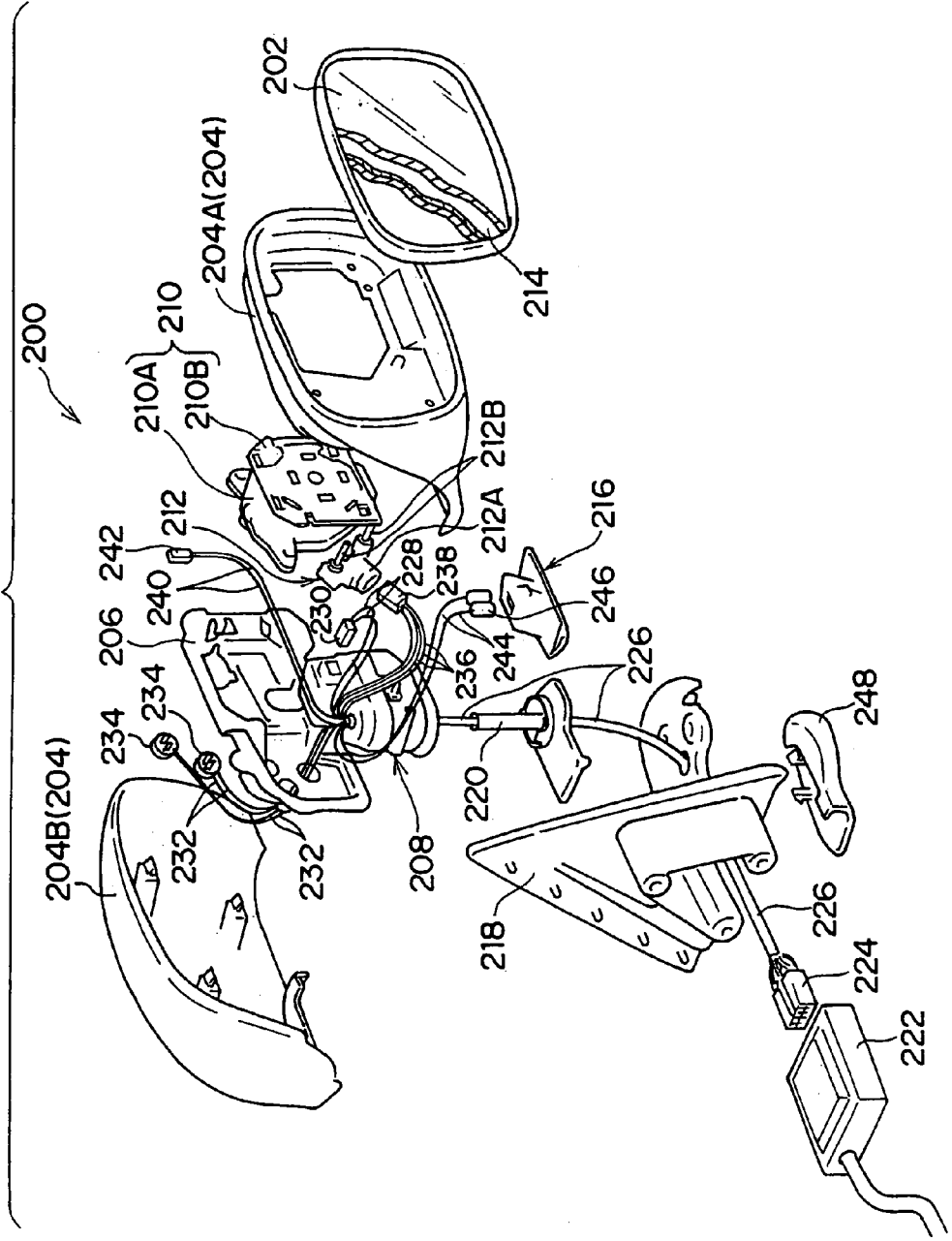
FIG. 9 is an exploded perspective view of a conventional outer mirror device for a vehicle.

A mirror surface angle adjusting unit 180, a mirror surface angle detecting sensor 182, and an ECU 184 structuring an outer mirror device for a vehicle relating to a fourth embodiment of the present invention are illustrated in FIG. 8 in a cross-sectional view which corresponds to FIG. 3. As shown in FIG. 8, the outer mirror device for a vehicle relating to the fourth embodiment is the same as the above-described outer mirror devices for a vehicle relating to the second and third embodiments with regard to the point that a driving mechanism portion 181, the mirror surface angle detecting sensor 182, and the ECU 184 structuring the mirror surface angle adjusting unit 180 are provided with a common unit case 186. However, the outer mirror device for a vehicle relating to the fourth embodiment differs from the first through third embodiments with regard to the point that the mirror surface angle detecting sensor 182 detects the mirror surface angle of the mirror 12 in a non-contact manner. Details will be described hereinafter.

The unit case 186 is structured by the front case 156A, the rear case 156B and an inner case 186A. The inner case 186A differs from the inner case 156C only with regard to the point that the sensor holes 76, 77 are not provided at the boss portions 61, 63.

Magnets 188 are embedded in the inner case 186A side open ends of the drive rods 54, 56 structuring the driving mechanism portion 181. The magnets 188 are structural parts of the mirror surface angle detecting sensor 182.

The mirror surface angle detecting sensor 182 has magnetism sensors 190 structured by magnetic resistor elements or Hall elements or the like. The magnetism sensors 190 are mounted on the control substrate 86 on imaginary extensions running along the axial direction of the drive rods 54, 56, and are electrically connected to the control substrate 86 (although such electrical connection is not illustrated). Specifically, for example, the magnetism sensor 190 which is formed by a magnetic resistor element is merely connected so as to be able to detect the voltage or the current between a pair of electrodes. The magnetism sensor 190 which is formed by a Hall element is connected so as to be able to apply voltage (current) between a pair of electrodes, and so as to be able to detect the voltage between the Hall electrodes.

The output (the voltage or current) of the magnetism sensor 190 varies in accordance with the strength of the magnetic field by the magnet 188, i.e., the distance from the magnet 188 to the drive rod 54 or 56. Namely, the mirror surface angle detecting sensor 182 is structured so as to detect the mirror surface angle of the mirror 12 in a non-contact manner, on the basis of the positions (distances) of the drive rods 54, 56 with respect to the magnetism sensors 190.

The other structures of the outer mirror device for a vehicle relating to the present fourth embodiment are exactly the same as those of the outer mirror devices for a vehicle relating to the above-described second and third embodiments.

Accordingly, in the outer mirror device for a vehicle having the mirror surface angle adjusting unit 180, the mirror surface angle detecting sensor 182, and the ECU 186, operations and effects which are exactly the same as those of the outer mirror device for a vehicle relating to the above-described third embodiment are exhibited.

Moreover, the mirror surface angle detecting sensor 182 is provided with the magnetism sensors 190 which do not contact the magnets 188 which are the direct objects of detection. Therefore, there are no regions which mechanically contact or engage between the mirror surface angle adjusting unit 180 and the mirror surface angle detecting sensor 182, and there is no need for high accuracy in the positional relationship therebetween, and the ability to assemble the mirror surface angle adjusting unit 180 and the mirror surface angle detecting sensor 182 respectively and the ability to assemble them together are good. In addition, because no friction or wear or the like accompanying mechanical contact or the like or the like is generated, there is no need to take countermeasures against such friction or wear or the like, and the cost can be reduced.

Because the mirror surface angle detecting sensor 182 has the non-contact-type magnetism sensors 190, no mechanical force from the drive rod 54 and the like is applied to the control substrate 86. Note that, even if a magnetism rotational sensor detecting the rotational position of the drive wheel 60 or the like in a non-contact manner is used in place of the mirror surface angle detecting sensor 182, the same effects that the ability to assemble is good and no mechanical force is applied to the control substrate can be achieved. In addition, in the present fourth embodiment, the unit case 156 may be used in place of the unit case 186.

Note that the present invention is not limited to the above-described first through fourth embodiments, and portions of or all of the structural elements which are the characteristic features of the respective embodiments may be appropriately combined. Accordingly, for example, the mirror surface angle detecting sensor 182 which is a non-contact-type sensor may be applied to the structure provided with the housing 48 and the ECU case 84 which are separate members.

Moreover, the respective above-described embodiments describe structures having, as the internal mechanisms, the electrically-driven retracting unit 18, the mirror surface angle adjusting units 20, 150, 160, 180, the mirror surface angle detecting sensors 22, 152, 162, 182, the foot lamp device 24, and the heater 26. However, the present invention is not limited to the same. It goes without saying that other internal mechanisms may be used in place of some or all of the above-described internal mechanisms, or together with some or all of the above-described internal mechanisms. Accordingly, in the outer mirror device 10 for a vehicle and the other above-described outer mirror devices for a vehicle, it is possible to accommodate within the door mirror visor 14 various internal mechanisms such as a mirror anti-glare mechanism using an electrochromic element, a water droplet removing mechanism using ultrasonic vibrations, an image pick-up device for picking-up the dead angles of a vehicle and displaying them on a screen within the vehicle, a direction indicating device, a speaker device for generating a sound or the like for warning or the like, or the like.

In addition, it goes without saying that the present invention is not limited to the structures, constitutions and the like of the respective internal mechanisms used in the above-described embodiments, i.e., the electrically-driven retracting unit 18, the mirror surface angle adjusting units 20, 150, 160, 180, the mirror surface angle detecting sensors 22, 152, 162, 182, the foot lamp device 24, and the heater 26. Accordingly, for example, the mirror surface angle detecting sensor 22 or the like may be structured so as to include sensor rods which follow the mirror holder 44 as in the conventional art, or the drive rod 54 and the like may be driven by a rack-and-pinion mechanism.

Moreover, the above-described embodiments are preferable structures in which there is no need for electrical connection via wires between the ECUs 28, 154, 164, 184, the mirror surface angle adjusting units 20, 150, 160, 180, and the mirror surface angle detecting sensors 22, 152, 162, 182. In the present invention, it suffices for at least the ECU 28 and the like (preferably, two internal mechanisms and the ECU 28 or the like which electrically charges or supplies power to these two internal mechanisms) to be disposed within the door mirror visor 14. For example, a structure is possible in which the ECU 28 or the like and the mirror surface angle adjusting unit 20 and the mirror surface angle detecting sensor 22, each of which is accommodated within the door mirror visor 14, are electrically connected via wires and waterproof connectors.

As described above, the outer mirror device for a vehicle relating to the present invention has the excellent effect that the number of wires led into a mirror visor from a vehicle body can be reduced.

What is claimed is:

1. An outer mirror device for a vehicle comprising:
   a mirror visor cover which covers a back surface of a mirror for rearward viewing to form a space between the mirror and the mirror visor cover;
   a mirror surface angle adjusting mechanism at which an electric motor, a rotating member rotating due to rotation of the electric motor, and a portion of a drive rod connected to the mirror and moving rectilinearly due to rotation of the rotating member, are accommodated in a first case, the mirror surface angle adjusting mechanism changing a mirror surface angle of the mirror by rectilinear movement of the drive rod;
   a control device having a second case which is connected to the first case within the space, and a control substrate which is accommodated within the second case and at which is provided a control circuit power-supplying the electric motor on a basis of an operation signal;
   a mirror surface angle detecting sensor disposed within the second case, and detecting one of a position of the drive rod and a rotational position of the rotating member,
   wherein one of said first and second cases includes a wall disposed between said mirror surface angle adjustment mechanism and said control device that includes an opening for accommodating an electrical connector having detachably connectible electrical terminals such that said electrical terminals are interconnected when said first and second cases are positioned adjacent to one another.

2. The outer mirror device for a vehicle of claim 1, wherein the mirror surface angle detecting sensor is provided at the control substrate.

3. The outer mirror device for a vehicle of claim 1, wherein the first case and the second case are integral.

4. The outer mirror device for a vehicle of claim 1, wherein said second case is water-tight.

5. The outer mirror device for a vehicle of claim 1, wherein said first and second cases include snap-fit connections for joining said cases together, and said electrical terminals of said electrical connector are interconnected when said snap-fit connections are connected.

6. The outer mirror device for a vehicle of claim 1, wherein said first case includes a frame wall that abuts said wall disposed between said control mechanism and said mirror surface angle adjustment mechanism.

7. The outer mirror device for a vehicle of claim 1, wherein said electrical terminals are interconnected when said first and second cases are assembled within said mirror visor cover.

8. The outer mirror device for a vehicle of claim 1, wherein said electrical connector includes a male side and a female side which are mounted on walls of one of said first and second cases and the other of said first and second cases, respectively, and which become detachably connected when said first and second cases are assembled within said visor cover.

* * * * *